US009986399B2

United States Patent
Mu et al.

(10) Patent No.: US 9,986,399 B2
(45) Date of Patent: May 29, 2018

(54) COMMUNICATIONS METHOD AND APPARATUS BASED ON SOCIAL APPLICATION

(71) Applicant: TENCENT TECHNOLOGY (SHENZHEN) COMPANY LIMITED, Shenzhen (CN)

(72) Inventors: Lu Mu, Shenzhen (CN); Xiaoguang Yao, Shenzhen (CN); Fanfan Wu, Shenzhen (CN); Liang Fan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days. days.

(21) Appl. No.: 15/173,764

(22) Filed: Jun. 6, 2016

(65) Prior Publication Data

US 2016/0286371 A1  Sep. 29, 2016

Related U.S. Application Data

(63) Continuation of application No. PCT/CN2015/078796, filed on May 12, 2015.

(30) Foreign Application Priority Data

May 13, 2014  (CN) .......................... 2014 1 0201499

(51) Int. Cl.
*H04L 12/58* (2006.01)
*H04W 4/02* (2018.01)
(Continued)

(52) U.S. Cl.
CPC ............... *H04W 4/18* (2013.01); *H04L 51/32* (2013.01); *H04L 67/306* (2013.01);
(Continued)

(58) Field of Classification Search
CPC ....... H04W 4/18; H04W 4/023; H04W 4/026; H04W 4/206; H04L 51/32; H04L 67/306
See application file for complete search history.

(56) References Cited

U.S. PATENT DOCUMENTS

| 7,113,977 B1 * | 9/2006 | Baker ..................... H04L 51/12 709/206 |
| 2004/0003037 A1 | 1/2004 | Fujimoto et al. |

(Continued)

FOREIGN PATENT DOCUMENTS

| CN | 101194526 A | 6/2008 |
| CN | 102546835 A | 7/2012 |

(Continued)

OTHER PUBLICATIONS

Search Report in EP Application No. 15792506.6 dated Apr. 3, 2017, 6 pages.

(Continued)

*Primary Examiner* — Marisol Figueroa
(74) *Attorney, Agent, or Firm* — Marshall, Gerstein & Borun LLP

(57) ABSTRACT

A communications method includes: acquiring at least one second user according to location information of a current terminal and a specified application identifier, the second user being a user whose geographical location is in a preset range of the current terminal; determining, when receiving a first selection instruction with respect to any user among the at least one second user, the second user corresponding to the first selection instruction as a target user, and acquiring a communication message to be sent, the communication message carrying a first user identifier of a user that has logged in to a specified application on the current terminal, a target user identifier, and second message content; sending the communication message to a specified application server when receiving a sending instruction. The specified appli- (Continued)

cation server sends the first user identifier and the second message content to the target user according to the target user identifier.

13 Claims, 11 Drawing Sheets

(51) Int. Cl.
*H04W 4/18* (2009.01)
*H04W 4/20* (2018.01)
*H04L 29/08* (2006.01)

(52) U.S. Cl.
CPC ........... *H04W 4/023* (2013.01); *H04W 4/026* (2013.01); *H04W 4/206* (2013.01)

(56) References Cited

U.S. PATENT DOCUMENTS

| | | | |
|---|---|---|---|
| 2009/0191898 A1* | 7/2009 | Lewis | H04W 4/02 455/456.3 |
| 2013/0145288 A1 | 6/2013 | Zadeh et al. | |
| 2015/0026275 A1 | 1/2015 | Zhang | |
| 2015/0061825 A1* | 3/2015 | Suzuki | H04W 4/206 340/5.52 |
| 2015/0163309 A1* | 6/2015 | Arnoud | H04L 67/18 455/456.3 |
| 2015/0253973 A1* | 9/2015 | Chiu | G06F 3/04847 715/752 |
| 2016/0036646 A1 | 2/2016 | Li et al. | |
| 2016/0286371 A1 | 9/2016 | Mu et al. | |

FOREIGN PATENT DOCUMENTS

| | | |
|---|---|---|
| CN | 103248723 A | 8/2013 |
| CN | 103491500 A | 1/2014 |
| CN | 103514558 A | 1/2014 |
| CN | 104009980 A | 8/2014 |
| WO | WO-98/37721 A2 | 8/1998 |
| WO | WO-2013/131444 A1 | 9/2013 |

OTHER PUBLICATIONS

International Preliminary Report on Patentability and Written Opinion in International Application No. PCT/CN2015/078796 dated Nov. 15, 2016, 5 pages.

Office Action in CN Application No. 201410201499.2 dated Feb. 28, 2015, 7 pages, with concise statement of relevance.

Search Report in International Application No. PCT/CN2015/078796 dated Aug. 17, 2015, 2 pages.

* cited by examiner

COMMUNICATIONS METHOD AND APPARATUS BASED ON SOCIAL APPLICATION

This application is a continuation of International Application No. PCT/CN2015/078796, filed on May 12, 2015. This application claims the benefit and priority of Chinese Patent Application No. 201410201499.2, entitled "COMMUNICATIONS METHOD AND APPARATUS BASED ON SOCIAL APPLICATION" and filed on May 13, 2014. The entire disclosures of each of the above applications are incorporated herein by reference.

FIELD OF THE TECHNOLOGY

The present disclosure relates to the field of the Internet, and in particular, to a communications method and apparatus based on a social application.

BACKGROUND OF THE DISCLOSURE

With the development of web technologies, more and more applications may be based on a same account mechanism. For example, an account of a social application may be used for login to another non-social application that uses a same account mechanism as the social application, and the non-social application may be a game application, a video playback application, or the like. Therefore, when a user logs in to the non-social application, the user can see social-application friends using the non-social application. For example, when a user uses a WeChat account to log in to the game WeMatch, the user can see WeChat friends playing the game; for another example, when a user uses a WeChat account to log in to a video client, the user can see, in the video client, WeChat friends using the video client.

In an actual application, a non-social application only displays a friend in a social application using a same account mechanism and a level of the friend. For example, in a game application, the user may check a game score of the friend, and in a video playback application, the user may check a recent playback record of the friend. In other words, the user can only acquire behavior of users on a user relation chain thereof, and limited by the account mechanism, the user cannot expand the social circle based on factors such as a shared hobby; the application can only provide a small amount of information.

SUMMARY

According to a first aspect, a communications method based on a social application is provided, including:

acquiring at least one second user according to location information of a current terminal and a specified application identifier, the second user being a user whose geographical location is in a preset range of the current terminal;

determining, when receiving a first selection instruction with respect to any user among the at least one second user, the second user corresponding to the first selection instruction as a target user, and acquiring a communication message to be sent, the communication message carrying a first user identifier of a user that has logged in to a specified application on the current terminal, a target user identifier, and second message content; and sending the communication message to a specified application server when receiving a sending instruction, so that the specified application server sends the first user identifier and the second message content to the target user according to the target user identifier.

According to a second aspect, a communications method based on a social application is provided, including:

acquiring at least one second user corresponding to a first user that has logged in to a specified application on a terminal, and sending the at least one second user to the terminal;

receiving a communication message sent by the terminal, the communication message carrying a first user identifier, a target user identifier, and second message content, and the target user identifier being an identifier of a user selected by the first user from the at least one second user; and sending the first user identifier and the second message content to the target user according to the target user identifier.

According to a third aspect, a communications apparatus based on a social application is provided, including a processor, a memory, and multiple instruction modules executed by a computer, the multiple instruction module comprising:

a first acquiring module, configured to acquire at least one second user according to location information of a current terminal and a specified application identifier, the second user being a user whose geographical location is in a preset range of the current terminal;

a second acquiring module, configured to determine, when receiving a first selection instruction with respect to any user among the at least one second user, the second user corresponding to the first selection instruction as a target user, and acquire a communication message to be sent, the communication message carrying a first user identifier of a user that has logged in to a specified application on the current terminal, a target user identifier, and second message content; and a first sending module, configured to send the communication message to a specified application server when receiving a sending instruction, so that the specified application server sends the first user identifier and the second message content to the target user according to the target user identifier.

BRIEF DESCRIPTION OF THE DRAWINGS

To illustrate the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the technical solutions, and advantages of the present disclosure clearer, the implementation manners of the present disclosure will be described in more detail below with reference to the accompanying drawings.

Figure 1:
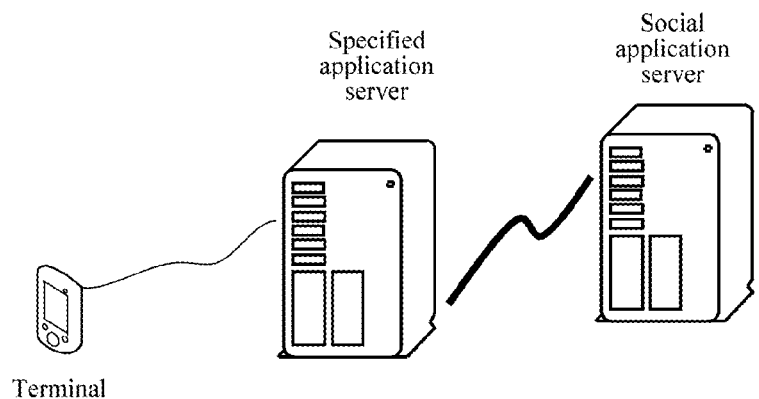
FIG. 1 is an architecture diagram of a system based on a social application according to an embodiment of the present invention.

FIG. 1 is an architecture diagram of a communications system based on a social application according to an embodiment of the present invention. Referring to FIG. 1, the communications system based on a social application includes a terminal, a specified application server, and a social application server. The terminal and the specified application server are connected through a network; the specified application server and the social application server are connected through a network. The terminal may be a mobile phone, a personal digital assistant (PDA), or the like.

The terminal is configured to exchange data with the specified application server, run various applications installed on the terminal, and display data of various applications, and the like. The specified application server is configured to receive a request sent by the terminal, and process the request sent by the terminal; the specified application server is further configured to store information of a user using the specified application; and the specified application server is further configured to exchange data with the social application server. The social application server is configured to provide data required by the social application, and is further configured to enable users to communicate with each other through the social application.

Figure 2:
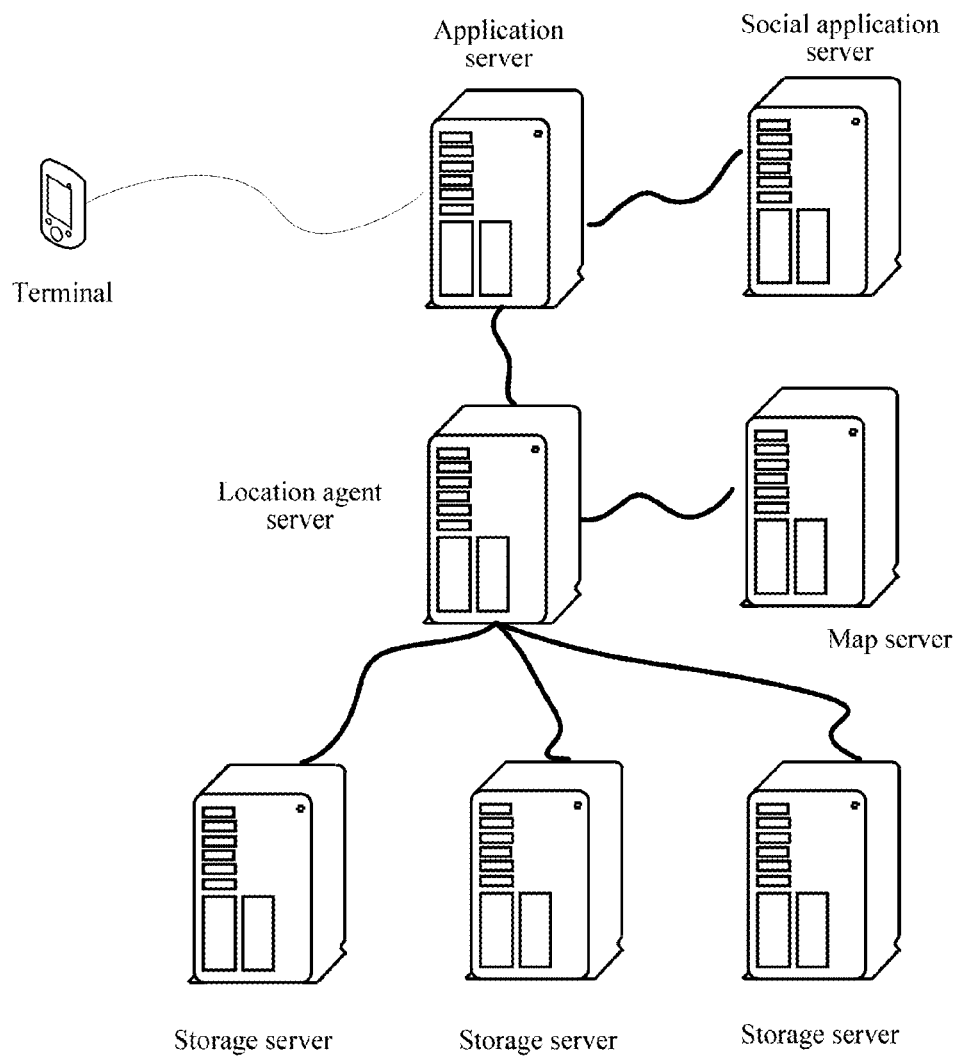
FIG. 2 is an architecture diagram of another system based on a social application according to an embodiment of the present invention.

FIG. 2 is an architecture diagram of another communications system based on a social application according to an embodiment of the present invention. Referring to FIG. 2, the communications system based on a social application includes a terminal, an application server, a social application server, a location agent server, a map server and multiple storage servers. The terminal and the application server are connected through a network; the application server and the social application server are connected through a network, and the application server is further connected to the location agent server through a network; the location agent server and the map server are connected through a network, and the location agent server is further connected to multiple storage servers through a network.

The terminal is configured to exchange data with the application server, run various applications installed on the terminal, and display data of various applications, and the like. The application server is configured to receive a request sent by the terminal and process the request sent by the terminal; the social application server is configured to provide data required by the social application, and is further configured to enable users to communicate with each other through the social application. The location agent server is configured to acquire location information of the terminal. The map server is configured to parse the location information, to obtain longitude and latitude data corresponding to the location information. The multiple storage servers are configured to user data, and the like.

Figure 3:
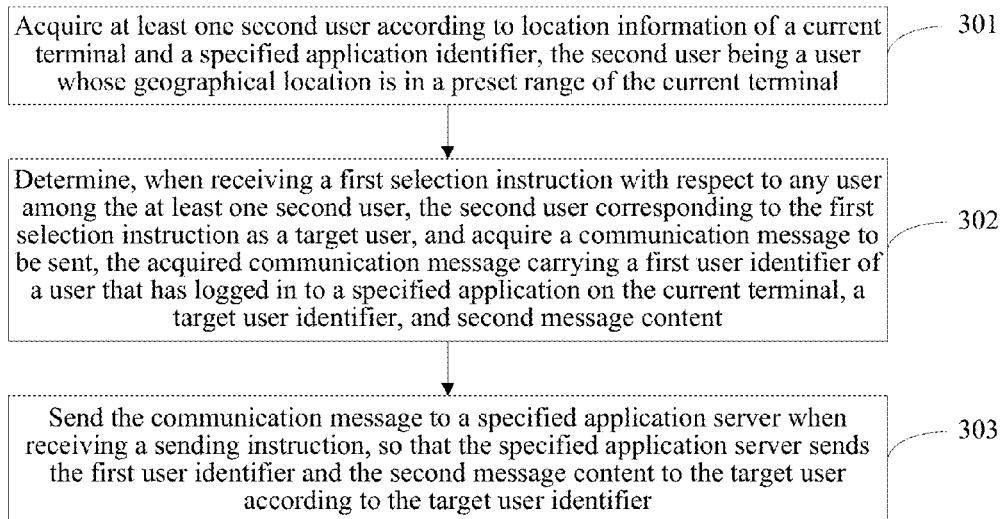
FIG. 3 is a flowchart of a method based on a social application according to an embodiment of the present invention.

FIG. 3 is a flowchart of a communications method based on a social application according to an embodiment of the present invention. Referring to FIG. 3, the method includes:

Step 301: Acquire at least one second user according to location information of a current terminal and a specified application identifier, the second user being a user whose geographical location is in a preset range of the current terminal.

Step 302: Determine, when receiving a first selection instruction with respect to any user among the at least one second user, the second user corresponding to the first selection instruction as a target user, and acquire a communication message to be sent, the acquired communication message carrying a first user identifier of a user that has logged in to a specified application on the current terminal, a target user identifier, and second message content.

Step 303: Send the communication message to a specified application server when receiving a sending instruction, so that the specified application server sends the first user identifier and the second message content to the target user according to the target user identifier.

In this embodiment of the present invention, a current terminal acquires, according to location information of a current terminal and a specified application identifier, at least one second user that has logged in to a specified application; when receiving a selection instruction with respect to any user among the at least one second user, determines the second user corresponding to the selection instruction as a target user; acquires a communication message to be sent, and sends the communication message to a specified application server when receiving a sending instruction, so that the specified application server sends the first user identifier and the second message content to the target user according to the target user identifier. In this way, a user can know behavior of users that are not on a relation chain thereof, a social circle of the user is expanded, and the amount of information that an application can provide is improved.

Optionally, the acquiring at least one second user according to location information of a current terminal and a specified application identifier includes:

acquiring the location information of the current terminal when receiving a check instruction;

sending an acquisition request to the specified application server, the acquisition request carrying the first user identifier and the location information of the current terminal, so that the specified application server acquires at least one second user from a user database according to the first user identifier and the location information, the user database storing an identifier of at least one user that logs in to the specified application and coordinate information of each user; and receiving the at least one second user sent by the specified application server.

Optionally, the method further includes:

acquiring a distance between the at least one second user and the current terminal;

sorting the at least one second user according to the distance between the at least one second user and the current terminal; and displaying the at least one second user according to a sorted order of the at least one second user.

Optionally, the acquiring a communication message to be sent includes:

displaying a message content editing page, the message content editing page including an editing interface and at least one piece of first message content;

generating, when receiving a second selection instruction with respect to the at least one piece of first message content, second message content according to an editing instruction received through the editing interface and the first message content corresponding to the second selection instruction; and generating the communication message according to the second message content, the first user identifier and the target user identifier.

Optionally, the method further includes:

intercepting, when the sending instruction is received, the communication message if the quantity of communication messages that have been sent in preset duration reaches a preset threshold and no reply message from the target user is received within the preset duration, and displaying interception prompt information; or determining, after the communication message is sent to the specified application server, that the specified application server has intercepted the communication message if interception prompt information sent by the specified application server is received, and displaying the interception prompt information.

All the possible technical solutions described above may be combined randomly to form optional embodiments of the present disclosure, which are not described in detail herein.

Figure 4:
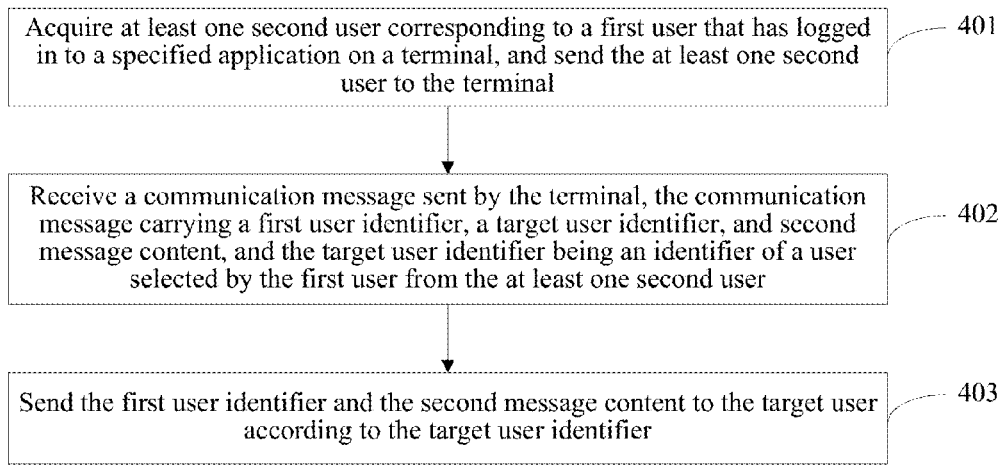
FIG. 4 is a flowchart of another method based on a social application according to an embodiment of the present invention.

FIG. 4 shows a communications method based on a social application according to an embodiment of the present invention. Referring to FIG. 4, the method includes:

Step 401: Acquire at least one second user corresponding to a first user that has logged in to a specified application on a terminal, and send the at least one second user to the terminal.

Step 402: Receive a communication message sent by the terminal, the communication message carrying a first user identifier, a target user identifier, and second message content, and the target user identifier being an identifier of a user selected by the first user from the at least one second user.

Step 403: Send the first user identifier and the second message content to the target user according to the target user identifier.

In this embodiment of the present invention, after acquiring at least one second use, the server sends the at least one second user to the terminal, and when receiving a communication message sent by the terminal, the server sends the first user identifier and the second message content to the target user according to the target user identifier. In this way, a user can know behavior of users that are not on a relation chain thereof, a social circle of the user is expanded, and the amount of information that an application can provide is improved.

Optionally, the acquiring at least one second user corresponding to a first user that has logged in to a specified application on a terminal, and sending the at least one second user to the terminal includes:

receiving an acquisition request sent by the terminal, the acquisition request carrying the first user identifier and location information of the terminal;

acquiring at least one second user from a user database according to the first user identifier and the location information of the terminal, the user database storing an identifier of at least one user that has logged in to the specified application and location information of each user; and sending the at least one second user to the terminal.

Optionally, the acquiring at least one second user from a user database according to the first user identifier and the location information of the terminal includes:

acquiring coordinate information of the terminal in a preset two-dimensional map according to the location information of the terminal;

determining, according to a circular area that uses a point corresponding to the coordinate information as a center and a preset distance as a radius, map grids that the circular area occupies in the preset two-dimensional map, the preset two-dimensional map including multiple map grids having a same size; and acquiring at least one second user from the user database according to the determined map grids and the first user identifier.

Optionally, the acquiring at least one second user from the user database according to the determined map grids and the first user identifier includes:

acquiring numbers of the determined map grids, and acquiring, from a stored correspondence between map grid numbers and user identifiers, corresponding user identifiers according to the acquired numbers of the map grids;

selecting, among the acquired user identifiers, another user identifier except the first user identifier;

acquiring, according to the selected user identifier, corresponding coordinate information from a stored correspondence between user identifiers and coordinate information; and determining at least one second user according to the acquired coordinate information.

Optionally, the determining at least one second user according to the acquired coordinate information includes:

determining a user corresponding to the acquired coordinate information as the at least one second user; or selecting, from the acquired coordinate information and according to the acquired coordinate information, the center and the radius, coordinate information corresponding to a geographical location that is in the preset range of the terminal, and determining a user corresponding to the selected coordinate information as the at least one second user.

Optionally, after the acquiring coordinate information of the terminal in a preset two-dimensional map according to the location information of the terminal, the method further includes:

calculating a map grid number corresponding to the coordinate information according to the coordinate information of the terminal in the preset two-dimensional map;

storing the map grid number and the first user identifier into a correspondence between map grid numbers and user identifiers; and storing the first user identifier and the coordinate information into a correspondence between user identifiers and coordinate information.

Optionally, after the receiving a communication message sent by the terminal, the method further includes:

intercepting, when the communication message sent by the terminal to the target user is received, the received communication message if the quantity of communication messages that have been received in preset duration reaches a preset threshold and no reply message sent by the target user to the terminal is received within the preset duration, and sending interception prompt information to the terminal.

All the possible technical solutions described above may be combined randomly to form optional embodiments of the present disclosure, which are not described in detail herein.

Because the communications method based on a social application provides two different implementation manners for acquiring at least one second user, the two implementation manners are elaborated in two different embodiments below.

Figure 5A:
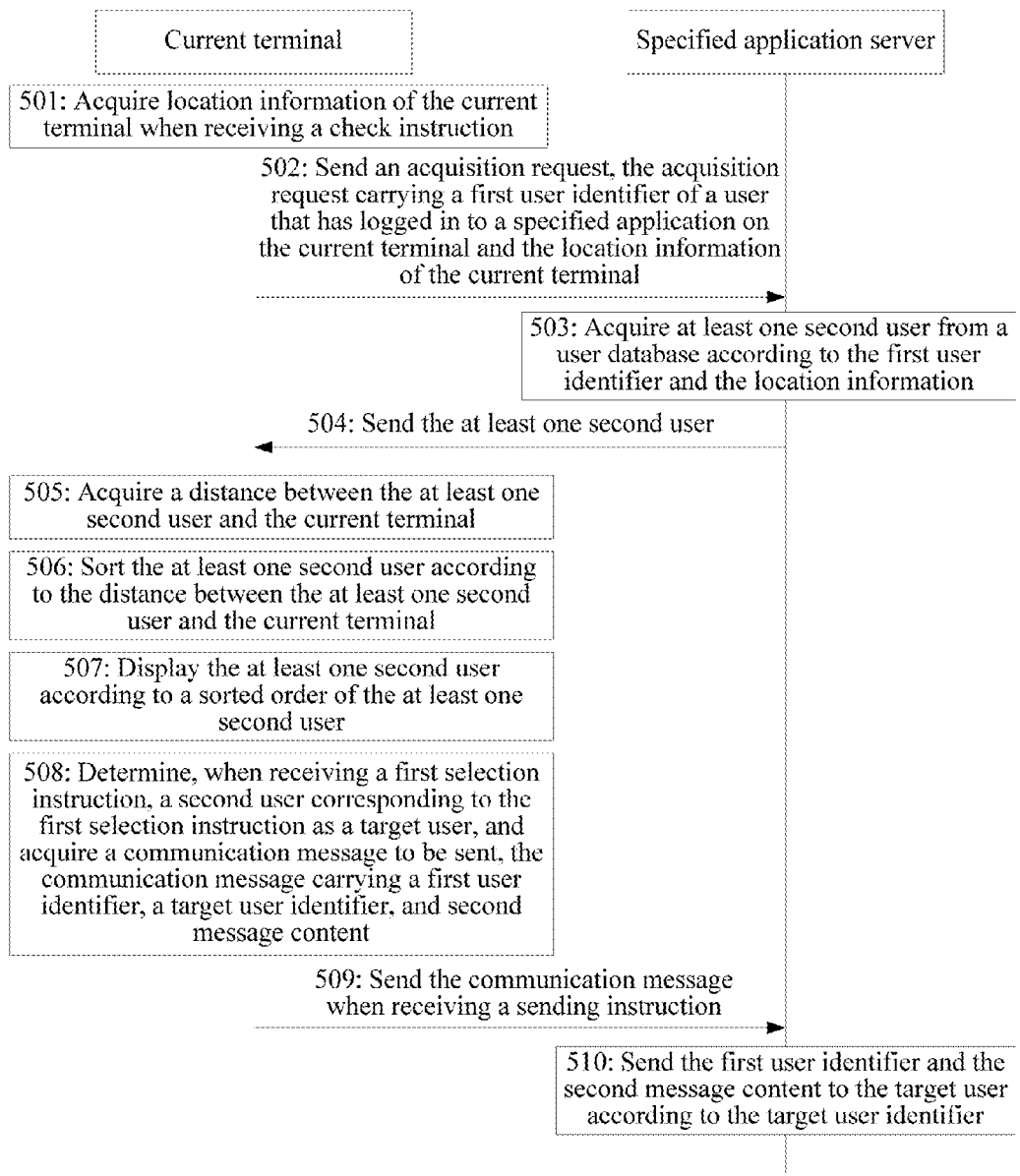
FIG. 5A is a flowchart of a method based on a social application according to an embodiment of the present invention.

FIG. 5A shows a communications method based on a social application according to an embodiment of the present invention; this embodiment of the present invention is described by using an example in which the communications method based on a social application is applied to an implementation environment shown in FIG. 1, and this embodiment of the present invention elaborates the first implementation manner for acquiring at least one second user in the communications method based on a social application. Referring to FIG. 5A, the method includes:

Step 501: Acquire location information of a current terminal if the current terminal receives a check instruction.

Specifically, when a user submits a check instruction to the current terminal, the current terminal receives the check instruction, and the current terminal determines whether a location function is enabled. If the location function is enabled, the current terminal uses the location function to acquire the location information of the current terminal; if the location function is not enabled, the current terminal displays a prompt box for enabling the location function, and if the current terminal receives a confirm instruction for enabling the location function, the current terminal enables the location function, and uses the location function to acquire the location information of the current terminal.

Figure 5B:
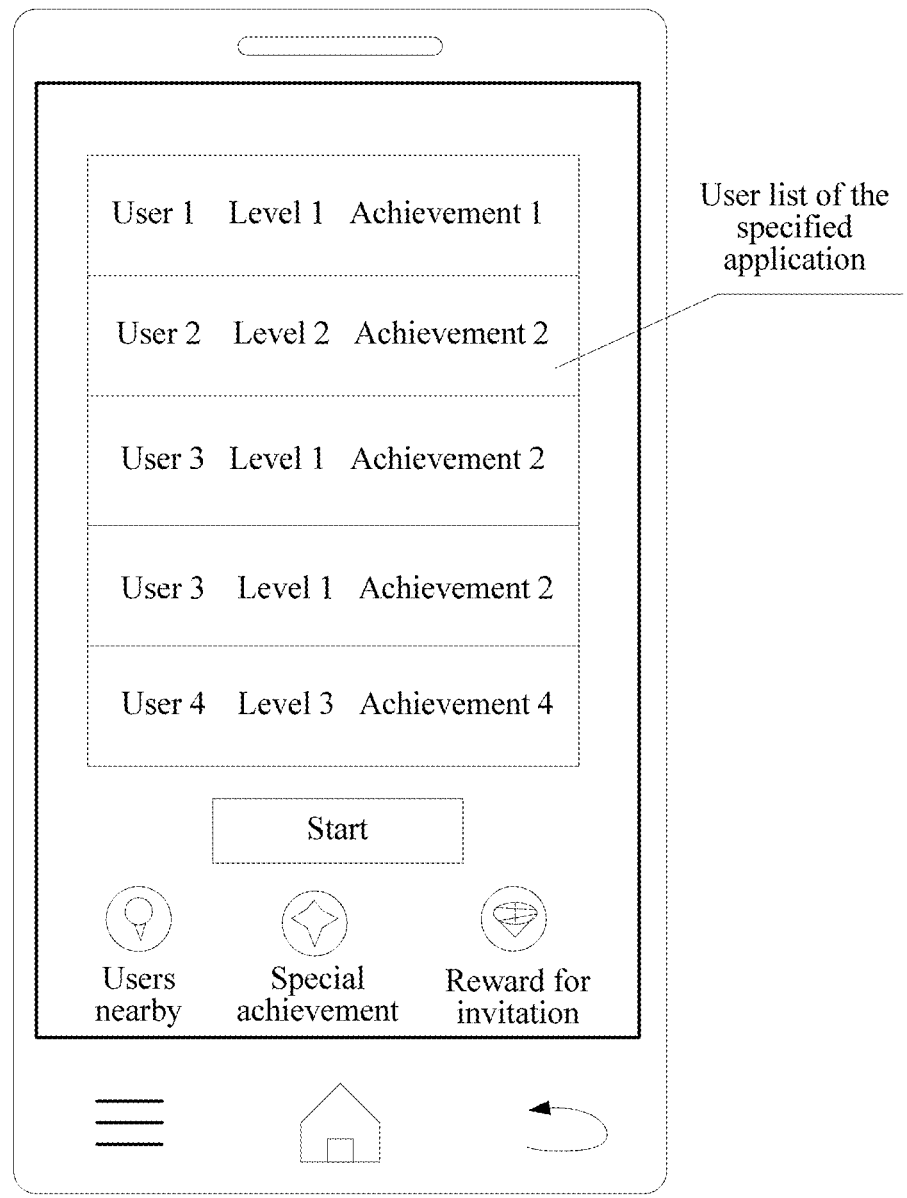
FIG. 5B is a schematic diagram of a main interface of a specified application according to an embodiment of the present invention.

The check instruction is used for checking users in a preset range of the current terminal, that is, the check instruction is used for checking users that are within a certain distance from the current terminal. As shown in FIG. 5B, FIG. 5B shows a main interface of a specified application according to an embodiment of the present invention. After a first user logs in to the specified application on the current terminal, the terminal displays the main interface shown in FIG. 5B. The main interface of the specified application includes a specified user list, and the specified user list includes information such as a level and an achievement of a user, where the user is one on a relation chain of the first user that logs in to the specified application on the current terminal. The main interface further includes a start button, a nearby user checking button, a special achievement button, and a reward-for-invitation button, and the user may click the nearby user checking button to submit a check instruction to the current terminal. The start button in the main interface is used for submitting a start instruction of using the specified application, the special achievement button is used for checking achievements of the user using the specified application, and the reward-for-invitation button is used for checking rewards that the user wins when using the specified application.

Figures 5C, 5D:
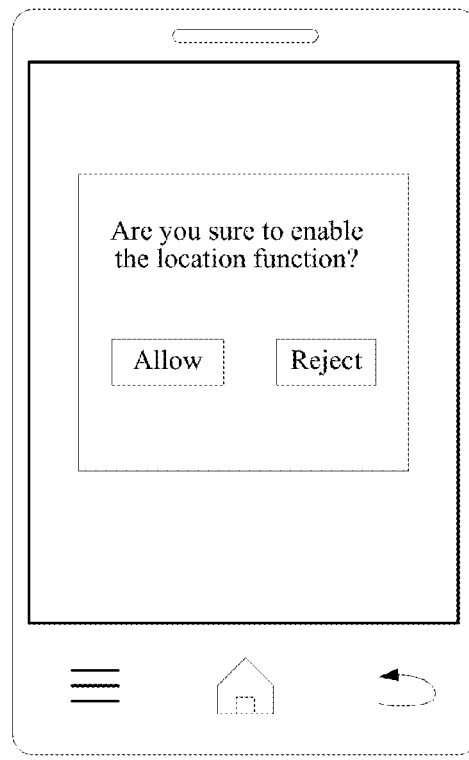
FIG. 5C is a schematic diagram of an interface of a prompt box for enabling a location function according to an embodiment of the present invention.
FIG. 5D is a schematic diagram of a type of map grid numbers according to an embodiment of the present invention.

If the current terminal does not enable the location function, the current terminal displays the prompt box for enabling the location function, as shown in FIG. 5C, where the prompt box for enabling the location function may include an "allow" button and a "reject" button. When the user clicks the "allow" button, it is determined that the user confirms enabling the location function, and in this case, the current terminal receives a confirm instruction for enabling the location function. When the user clicks the "reject" button, it is determined that the user does not want to enable the location function, and in this case, the current terminal receives a rejection instruction of not enabling the location function; when receiving the rejection instruction, the terminal ends operation. The terminal returns to the main interface of the specified application shown in FIG. 5B.

It should be noted that, the manner shown in FIG. 5B is merely used as an example for describing a check instruction submission manner, and the manner shown in FIG. 5C is also merely used as an example for describing a display manner of the prompt box for enabling the location function. In an actual application, the check instruction may be submitted in other manners, and the prompt box for enabling the location function may also be displayed in other manners, which are not listed one by one in the present disclosure.

Step 502: The current terminal sends an acquisition request to a specified application server, the acquisition request carrying a first user identifier of a user that has logged in to a specified application on the current terminal and the location information of the current terminal.

Specifically, the current terminal acquires a first user identifier of a user that has logged in to a specified application on the current terminal, generates an acquisition request according to the first user identifier and the location information of the current terminal, and sends the acquisition request to the specified application server.

In this embodiment of the present invention, the user may use an account of a social application to log in to the specified application, and in this case, the current terminal stores a first user identifier of a user that has logged in to the specified application. The first user identifier may be an identifier of the social application, or a user identifier of the user in the social application, where the user identifier of the user in the social application may be an account that the user registers in the social application, and certainly, may also be a nickname of the user in the social application, and the like.

Step 503: The specified application server acquires at least one second user from a user database according to the first user identifier and the location information when receiving the acquisition request, the user database storing an identifier of at least one user that logs in to the specified application and coordinate information of each user.

Specifically, when the specified application server receives the acquisition request, the specified application server acquires coordinate information of the current terminal in a preset two-dimensional map according to the location information; determines, according to a circular area that uses a point corresponding to the coordinate information as a center and a preset distance as a radius, map grids that the circular area occupies in the preset two-dimensional map, where the preset two-dimensional map includes multiple map grids having a same size; and acquires at least one second user from the user database according to the determined map grids and the first user identifier.

A specific operation of acquiring, by the specified application server, coordinate information of the current terminal in a preset two-dimensional map according to the location information may be: parsing, by the specified application server, the location information, to obtain longitude and latitude data of the current terminal. According to the longitude and latitude data of the current terminal, the coordinate information of the current terminal in the preset two-dimensional map is calculated by using the following formula (1), where the coordinate information includes an abscissa and an ordinate.

$$\begin{cases} x = (180 - j) \times 40000 \times 10^3 / 360 \\ y = (90 - w) \times 20000 \times 10^3 / 180 \end{cases} \quad (1)$$

where in the foregoing formula (1), x is an abscissa of the current terminal in the preset two-dimensional map, j is longitude data of the current terminal, y is an ordinate of the current terminal in the preset two-dimensional map, and w is latitude data of the current terminal.

It should be noted that, the earth is a slightly flattened sphere, where the length of the equator is 40076 kilometers, and the length of the meridian is 40009 kilometers. The earth is approximated as a rectangle (referring to world maps we hang on the wall) using the equator as the long side of the rectangle. Then, the length of the rectangle is the length of the equator, and in this embodiment of the present invention, 40000 kilometers is used as the length of the rectangle, and 20000 kilometers is used as the width of the rectangle. In this case, the length represented by one longitude degree may be 40000 kilometers/360, and the length represented by one latitude degree is 20000 kilometers/180. In addition, in this embodiment of the present invention, a location at 180 degrees east longitude and 90 degrees north latitude is used as the origin of coordinates in the preset two-dimensional map, where the longitude represents a horizontal axis, a positive direction of the horizontal axis is east to west, the latitude represents a vertical axis, and a positive direction of the vertical axis is north to south. In this case, a preset two-dimensional map can be obtained, then the preset two-dimensional map is divided to obtain multiple square map grids having a same size, and the multiple map grids having a same size are numbered according to a given rule. For example, in this embodiment of the present invention, the preset two-dimensional map may be divided by using a square having a side length of 100 meters as a unit, and the map grids in the preset two-dimensional map may be numbered in ascending order along the horizontal axis from the origin of coordinates, as shown in FIG. 5. Certainly, the map grids in the preset two-dimensional map may also be numbered in ascending order along the vertical axis from the origin of coordinates, and this embodiment of the present invention is described by using an example in which the map grids in the preset two-dimensional map are numbered in ascending order along the horizontal axis from the origin of coordinates.

Further, after the acquiring, by the specified application server, coordinate information of the terminal in a preset two-dimensional map according to the location information, the method further includes:

calculating a map grid number corresponding to the coordinate information according to the coordinate information of the terminal in the preset two-dimensional map; storing the calculated map grid number and the first user identifier into a correspondence between map grid numbers and user identifiers; and storing the first user identifier and the acquired coordinate information into a correspondence between user identifiers and coordinate information.

According to the coordinate information of the terminal in the preset two-dimensional map, the map grid number corresponding to the coordinate information is calculated by using the following formula (2);

$$\text{GridGID} = [(40000 \times 1000)/s] \times \lfloor y/s \rfloor + \lfloor x/s \rfloor + 1 \quad (2)$$

where in the foregoing formula (2), is the map grid number corresponding to the coordinate information, s is a side length of the map grid in the preset two-dimensional map, which is a known variable, and in this embodiment of the present invention, s is 100, and represents a round down operation.

A specific operation of storing the calculated map grid number and the first user identifier into a correspondence between map grid numbers and user identifiers may be: if the stored correspondence between map grid numbers and user identifiers includes a record corresponding to the first user identifier, replacing a map grid number corresponding to the first user identifier in the stored correspondence between map grid numbers and user identifiers with the calculated map grid number; or if the stored correspondence between map grid numbers and user identifiers does not include a record corresponding to the first user identifier, creating a corresponding record in the correspondence between map grid numbers and user identifiers, and storing the calculated map grid number and the first user identifier into the created record.

A specific operation of storing the first user identifier and the acquired coordinate information into a correspondence between user identifiers and coordinate information may be: if the stored correspondence between user identifiers and coordinate information includes a record corresponding to the first user identifier, replacing coordinate information corresponding to the first user identifier in the stored correspondence between user identifiers and coordinate information with the acquired coordinate information; or if the stored correspondence between user identifiers and coordinate information does not include a record corresponding to the first user identifier, creating a corresponding record in the correspondence between user identifiers and coordinate information, and storing the acquired coordinate information and the first user identifier into the created record.

A specific operation of acquiring at least one second user from a user database according to the determined map grids and the first user identifier may be: acquiring numbers of the determined map grids, and acquiring corresponding user identifiers from the stored correspondence between map grid numbers and user identifiers according to the acquired numbers of the map grids; selecting, among the acquired user identifies, another user identifier except the first user identifier, and acquiring corresponding coordinate information from the stored correspondence between user identifiers and coordinate information according to the selected user identifier; and determining at least one second user according to the acquired coordinate information.

The user may use different social application accounts to log in to the specified application, and therefore, in this embodiment of the present invention, user identifiers stored in the specified application server may further be marked by using social application identifiers. In this embodiment of the present invention, user identifiers marked by a same social application identifier may be acquired, and users corresponding to the acquired user identifiers are determined as the at least one second user.

Further, in the specified application server, a timestamp may be set for each record in the correspondence between user identifiers and coordinate information, and during selection of at least one second user, a user in a first preset period that is prior to the current time and is closest to the current time may be selected; in this case, a specific operation of acquiring corresponding coordinate information from the stored correspondence between user identifiers and coordinate information according to the selected user identifier may be: acquiring corresponding coordinate information from the stored correspondence between user identifiers and coordinate information according to the selected user identifier, and acquiring a current time, and selecting, according to a timestamp corresponding to a record to which the acquired coordinate information belongs, coordinate information in a first preset period whose timestamp is prior to the current time and is closest to the current time.

In this embodiment of the present invention, the manner of acquiring at least one second user according to the acquired coordinate information may be implemented according to any of the following two situations, including:

The first situation: Determine a user corresponding to the acquired coordinate information as the at least one second user.

In this embodiment of the present invention, when the preset two-dimensional map is divided into map grids, the size of the map grids is relatively small, and therefore, a given error is allowed when the at least one second user is acquired, and the user corresponding to the acquired coordinate information may be directly determined as the at least one second user.

The second situation: Select, from the acquired coordinate information and according to the acquired coordinate information, the center and the radius, coordinate information corresponding to a geographical location that is in the preset range of the terminal, and determine a user corresponding to the selected coordinate information as the at least one second user.

To acquire the at least one second user precisely, a distance between the user corresponding to the acquired coordinate information and the current terminal may be calculated precisely according to the second manner, thereby acquiring the at least one second user according to the distance.

Step 504: The specified application server sends the at least one second user to the current terminal.

In the specified application server, the user identifier may be used to uniquely identify the user, and in this case, the specified application server may send the user identifier of the at least one second user to the current terminal, and may further send the coordinate information of the at least one second user to the current terminal.

Step 505: The current terminal acquires a distance between the at least one second user and the current terminal when the current terminal receives the at least one second user sent by the specified application server.

In this embodiment of the present invention, the specified application server may send the coordinate information of the at least one second user to the current terminal, so that the current terminal calculates the distance between the at least one second user and the current terminal according to the coordinate information of the at least one second user and the location information of the current terminal. Certainly, the specified application server may also calculate the distance between the at least one second user and the current terminal according to the coordinate information of the at least one second user and coordinate information of the current terminal, and sends the distance between the at least one second user and the current terminal to the current terminal, which is not specifically limited in this embodiment of the present invention.

A specific operation of calculating, by the current terminal, the distance between the at least one second user and the current terminal according to the coordinate information of the at least one second user and the location information of the current terminal may be: acquiring coordinate information of the current terminal, and calculating the distance between the at least one second user and the current terminal according to the coordinate information of the at least one second user and the coordinate information of the current terminal.

An operation of acquiring coordinate information of the current terminal may be any one of the following two situations: (a), the current terminal parses the location information of the current terminal, to obtain longitude and latitude data of the current terminal, and calculates the coordinate information of the current terminal according to the longitude and latitude data of the current terminal and by using the foregoing formula (1); and (b), the specified application server sends the coordinate information of the current terminal to the current terminal.

It should be additionally noted that, the calculating, by the current terminal, the distance between the at least one second user and the current terminal according to the coordinate information of the at least one second user and the coordinate information of the current terminal may be calculating a linear distance between the coordinate information of the at least one second user and the coordinate information of the current terminal, which is not elaborated herein.

Step 506: The current terminal sorts the at least one second user according to the distance between the at least one second user and the current terminal.

The current terminal sorts the at least one second user in descending order of the distance between the at least one second user and the current terminal. Certainly, the current terminal may also sort the at least one second user in ascending order of the distance between the at least one second user and the current terminal.

Optionally, the current terminal may further sort the at least one second user according to the level of the at least one second user in the specified application, or the current terminal may sort the at least one second user according to an initial letter of the nickname of the at least one second user, which is not specifically limited in this embodiment of the present invention; besides, this embodiment of the present invention is described by using an example in which the at least one second user is sorted according to the distance between the at least one second user and the current terminal.

Step 507: The current terminal displays the at least one second user according to a sorted order of the at least one second user.

Figure 5E:
FIG. 5E is a schematic diagram of an interface for displaying users nearby according to an embodiment of the present invention.

If the current terminal sorts the at least one second user in descending order of the distance between the at least one second user and the current terminal, the current terminal may display the at least one second user in reverse order of the sorted order of the at least one second user. If the current terminal sorts the at least one second user in ascending order of the distance between the at least one second user and the current terminal, the current terminal may display the at least one second user in the sorted order of the at least one second user. The current terminal may either display the at least one second user in the sorted order of the at least one second user or display the at least one second user in reverse order of the sorted order of the at least one second user, as long as the current terminal displays the at least one second user in ascending order of the distance between the at least one second user and the current terminal. For example, as shown in FIG. 5E, the acquired at least one second user includes second user 1, second user 2, second user 3, and second user 4; the distance between second user 1 and the current terminal is 1000 meters, the distance between second user 2 and the current terminal is 200 meters, the distance of second user 3 and the current terminal is 400 meters, and the distance between second user 4 and the current terminal is 700 meters. Therefore, the at least one second user is displayed in the following order: second user 2, second user 3, second user 4, and second user 1; the nickname, avatar, and the like of the at least one second user may be displayed when the at least one second user is displayed, where the nickname of second user 2 is Water Moon@Shenzhen, the nickname of second user 3 is Astro Boy, the nick name of second user 4 is Mr. Shaw, and the nickname of second user 1 is Roy Wing.

Figure 5F:
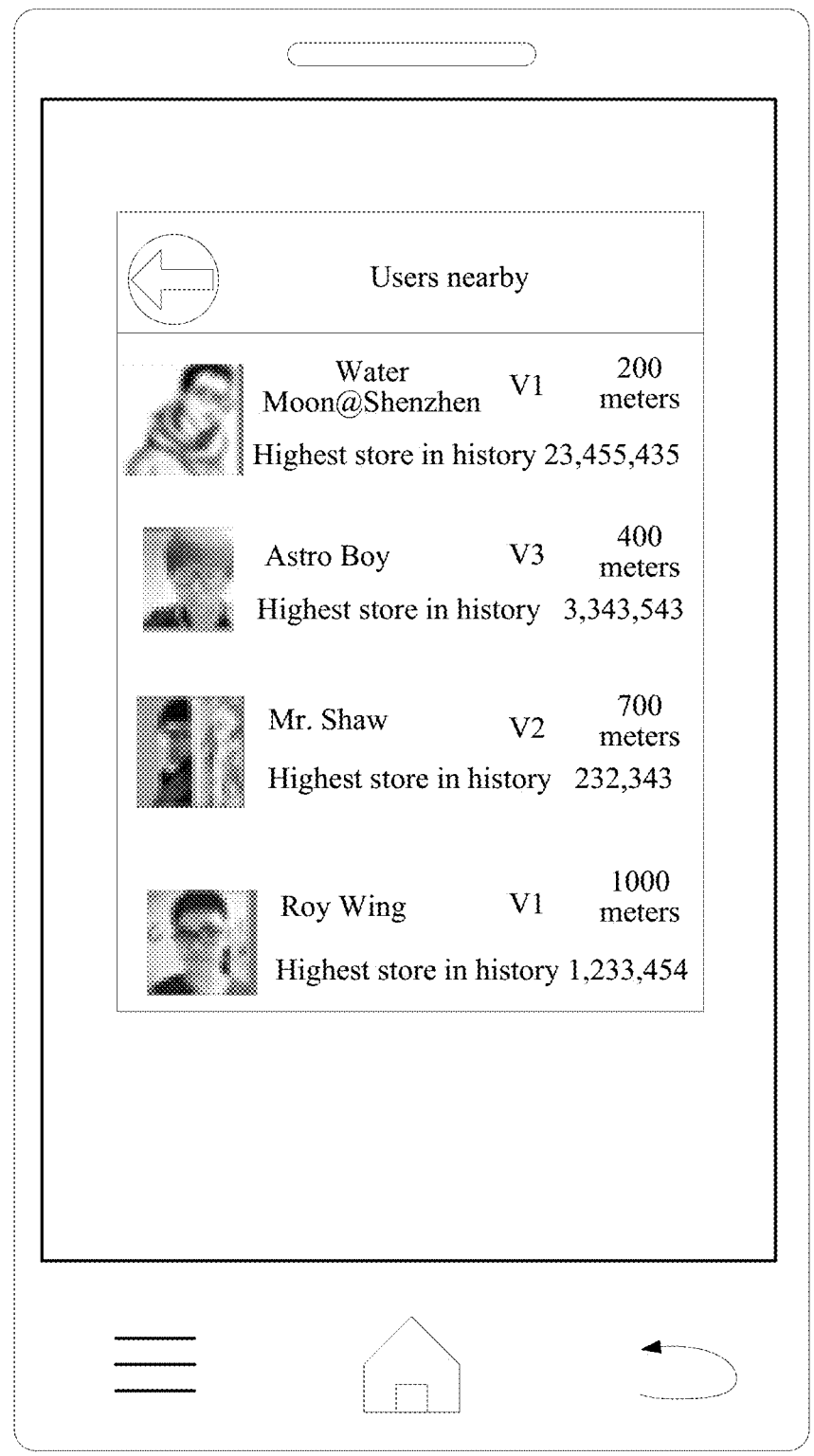
FIG. 5F is a schematic diagram of another interface for displaying users nearby according to an embodiment of the present invention.

Optionally, the terminal may further display, at a position corresponding to the at least one second user, the distance between the at least one second user and the current terminal, and the level, score, and the like of the at least one second user. For example, as shown in FIG. 5F, at a position corresponding to each second user, the distance between the user and the current terminal is displayed. Further, the level of second user 1 is V1, and the score of second user 1 is 1,233,454; the level of second user 2 is V1, and the score of second user 2 is 23,455,435; the level of second user 3 is V3, and the score of second user 3 is 3,343,543; the level of second user 4 is V2, and the score of second user 4 is 232,343; and the level and score of each user may further be displayed in FIG. 5F.

It should be noted that, the at least one second user may be displayed not only in the manner shown in FIG. 5E, but also in other manners, and the manner shown in FIG. 5E is merely used as an example in this embodiment of the present invention for description. In addition, the distance between the at least one second user and the current terminal, and the score and level of the at least one second user may be displayed not only in the manner shown in FIG. 5F, but also in other manners, and the manner shown in FIG. 5F is merely used as an example in this embodiment of the present invention for description.

Step 508: Determine, when receiving a first selection instruction with respect to any user among the at least one second user, the second user corresponding to the first selection instruction as a target user, and acquire a communication message to be sent, the communication message carrying a first user identifier, a target user identifier, and second message content.

The first selection instruction may be triggered by a user, and when the user needs to trigger the first selection instruction, the user may perform a preset operation on the at least one second user displayed on the display interface of the current terminal to trigger the first selection instruction. The preset operation may be a click operation, a double click operation, a multiple-click operation, a slide operation, a drag operation, a voice operation, and the like.

A specific operation of acquiring a communication message to be sent may be: displaying a message content editing page, the message content editing page including an editing interface and at least one piece of first message content; when receiving a second selection instruction with respect to the at least one piece of first message content, generating second message content according to an editing instruction received through the editing interface and the first message content corresponding to the second selection instruction; and generating the communication message according to the second message content, the first user identifier, and the target user identifier.

Optionally, a specific operation of acquiring a communication message to be sent may also be: randomly selecting one piece of first message content from multiple pieces of stored first message content, and displaying a message content editing page, the message content editing page including an editing interface and the selected first message content; when receiving an editing instruction through the editing interface, editing the first message content displayed on the message content editing page, to obtain second message content, and generating the communication message according to the second message content, the first user identifier and the target user identifier.

Figure 5G:
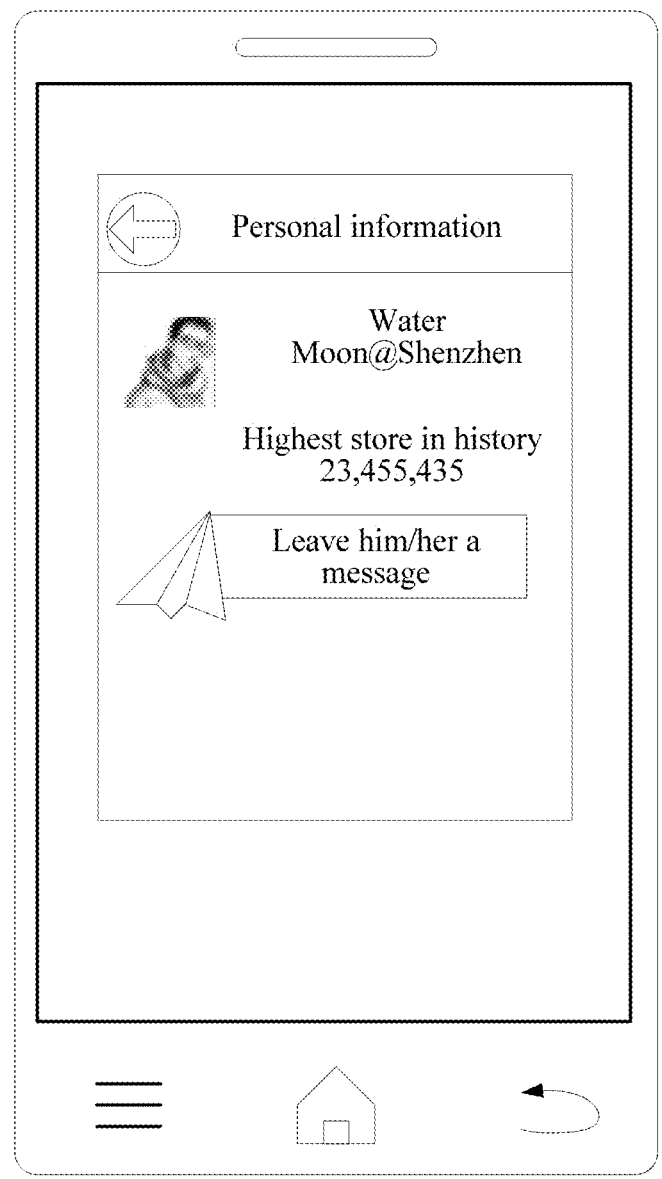
FIG. 5G is a schematic diagram of a personal information interface of a target user according to an embodiment of the present invention.
Figure 5H:
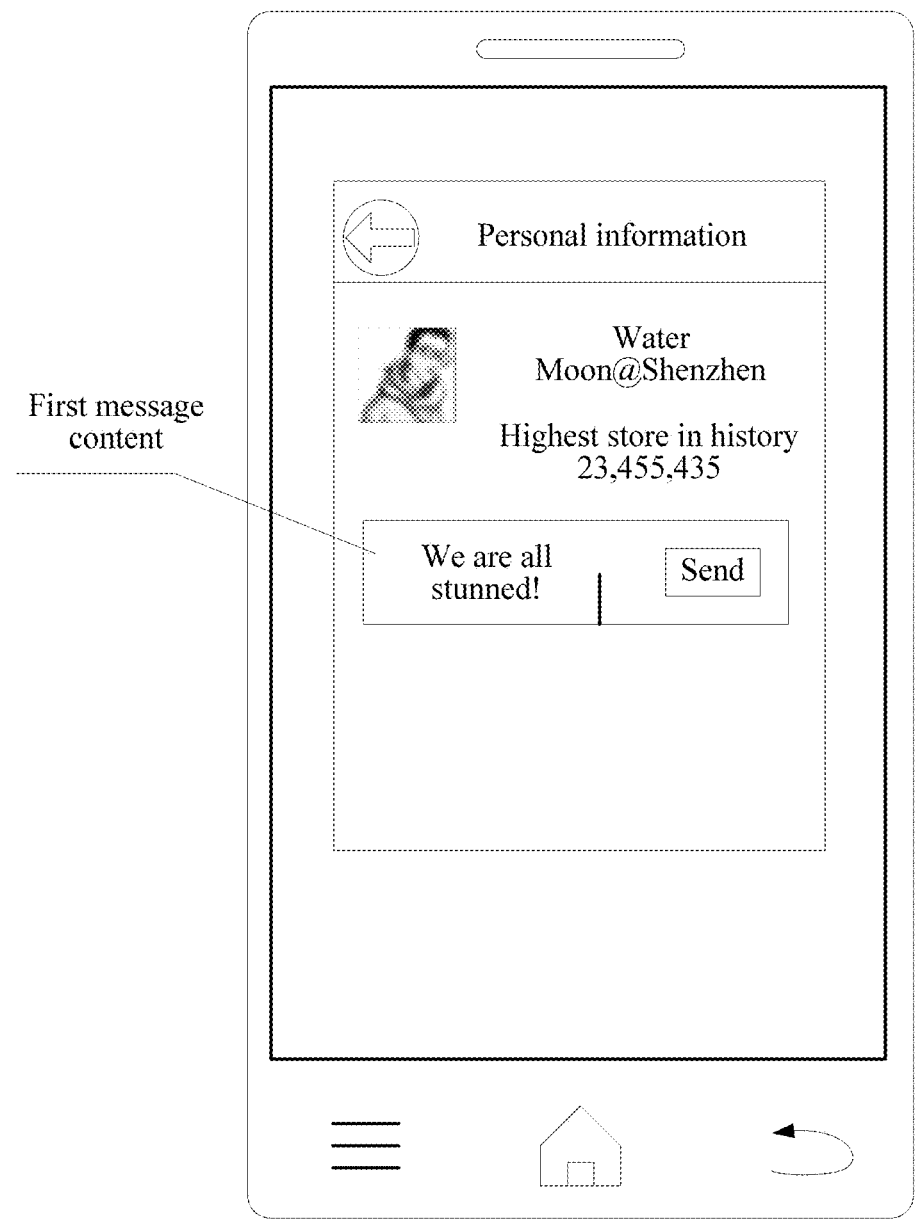
FIG. 5H is a schematic diagram of a message content editing page according to an embodiment of the present invention.

For example, when the current terminal receives a first selection instruction with respect to any user among the at least one second user, the current terminal may display personal information of the target user as shown in FIG. 5G, where the personal information of the target user shown in FIG. 5G includes the nickname "Water Moon@Shenzhen" of the target user, a highest score in history, which is "23,455,435", of the target user using the specified application and a button of "leave him/her a message", and when the user clicks the button of "leave him/her a message", the interface of the current terminal goes to the message content editing page, as shown in FIG. 5H; the editing interface in FIG. 5H displays the first message content, and the user may submit an editing instruction through the editing interface and edit the first message content; and the FIG. 5H also shows a "send" button, which is used to submit a sending instruction.

In this embodiment of the present invention, when the user communicates with the target user, the current terminal first displays at least one piece of first message content on the message content editing page, so as to prompt the user when the user does not know what to say to the target user. Moreover, the current terminal further provides an editing interface, and when the user submits an editing instruction through the editing interface, the user may edit the displayed first message content; in this way, the user can customize message content, so that the message content is not dull.

Step 509: The current terminal sends the communication message to the specified application server when receiving a sending instruction.

The sending instruction is used for sending the communication message to the specified application server, and the sending instruction may be triggered by the user or the terminal. When the user needs to trigger the sending instruction, the user may perform a preset operation on the display interface of the current terminal to trigger the sending instruction. The preset operation may be a click operation, a double click operation, a multiple-click operation, a slide operation, a drag operation, a voice operation, and the like. When the terminal needs to trigger the sending instruction, the terminal may detect a period of time during which no editing instruction is received in the editing interface, and when the period of time reaches a second preset period, the terminal triggers the sending instruction.

Step 510: The specified application server sends the first user identifier and the second message content to the target user according to the target user identifier when the specified application server receives the communication message.

When the terminal uses the specified application for the first time and logs in to the specified application by using a social application account, the specified application server sends an authorization message to the terminal. When the terminal receives the authorization message, the terminal displays the authorization message to the user. When the user agrees to use the social application account to log in to the specified application, the terminal sends an authorization success message to the specified application server. The specified application server receives the authorization success message, and sends the authorization success message to the social application server. The social application server receives the authorization success message, acquires a user identifier and an open Identity (open ID) corresponding to the social application account of the user, and sends, to the specified application server, the user identifier and open ID corresponding to the social application account.

Further, the specified application server receives the user identifier and open ID corresponding to the social application account. The specified application server stores the user identifier and the open ID corresponding to the social application account into a correspondence between user identifiers and open IDs.

Specifically, a specific operation of sending, by the specified application server, the first user identifier and the second message content to the target user according to the target user identifier may be: acquiring, by the specified application server, a corresponding open ID from a stored correspondence between user identifiers and open IDs according to the target user identifier, and sending the first user identifier and the second message content to the target user according to the acquired open ID.

Further, to prevent the target user from being disturbed by harassment information, this embodiment of the present invention further sets an anti-harassment mechanism, where a specific process of the anti-harassment mechanism is as follows:

intercepting, by the current terminal when the current terminal receives the sending instruction, the communication message if the quantity of communication messages that have been sent in preset duration reaches a preset threshold and no reply message from the target user is received within the preset duration, and displaying interception prompt information; or determining, after the current terminal sends the communication message to the specified application server, that the specified application server has intercepted the communication message if interception prompt information sent by the specified application server is received, and displaying the interception prompt information.

The anti-harassment mechanism may be implemented in the terminal or in the specified application server. If the anti-harassment mechanism is implemented in the specified application server, when the specified application server receives the communication message that is sent by the terminal to the target user, the specified application server needs to determine whether the quantity of communication messages that have been received in preset duration reaches a preset threshold and whether a reply message sent by the target user to the terminal is received within the preset duration, and if the quantity of communication messages that have been received in the preset duration reaches the preset threshold and no reply message sent by the target user to the terminal is received within the preset duration, the specified application server intercepts the received communication message, and sends interception prompt information to the terminal.

In this embodiment of the present invention, the specified application is a non-social application, and the specified application server is a server corresponding to the non-social application. The main function of a social application is communication between users, while communication between users is not the main function of a non-social application; therefore, in this embodiment of the present invention, communication between users of a non-social application can be implemented based on a social application.

In this embodiment of the present invention, a current terminal acquires, according to location information of a current terminal and a specified application identifier, at least one second user that has logged in to a specified application; when receiving a selection instruction with respect to any user among the at least one second user, determines the second user corresponding to the selection instruction as a target user; acquires a communication message to be sent, and sends the communication message to a specified application server when receiving a sending instruction, so that the specified application server sends the first user identifier and the second message content to the target user according to the target user identifier. In this way, a user can know behavior of users that are not on a relation chain thereof, a social circle of the user is expanded, and the amount of information that an application can provide is improved.

Figure 6A:
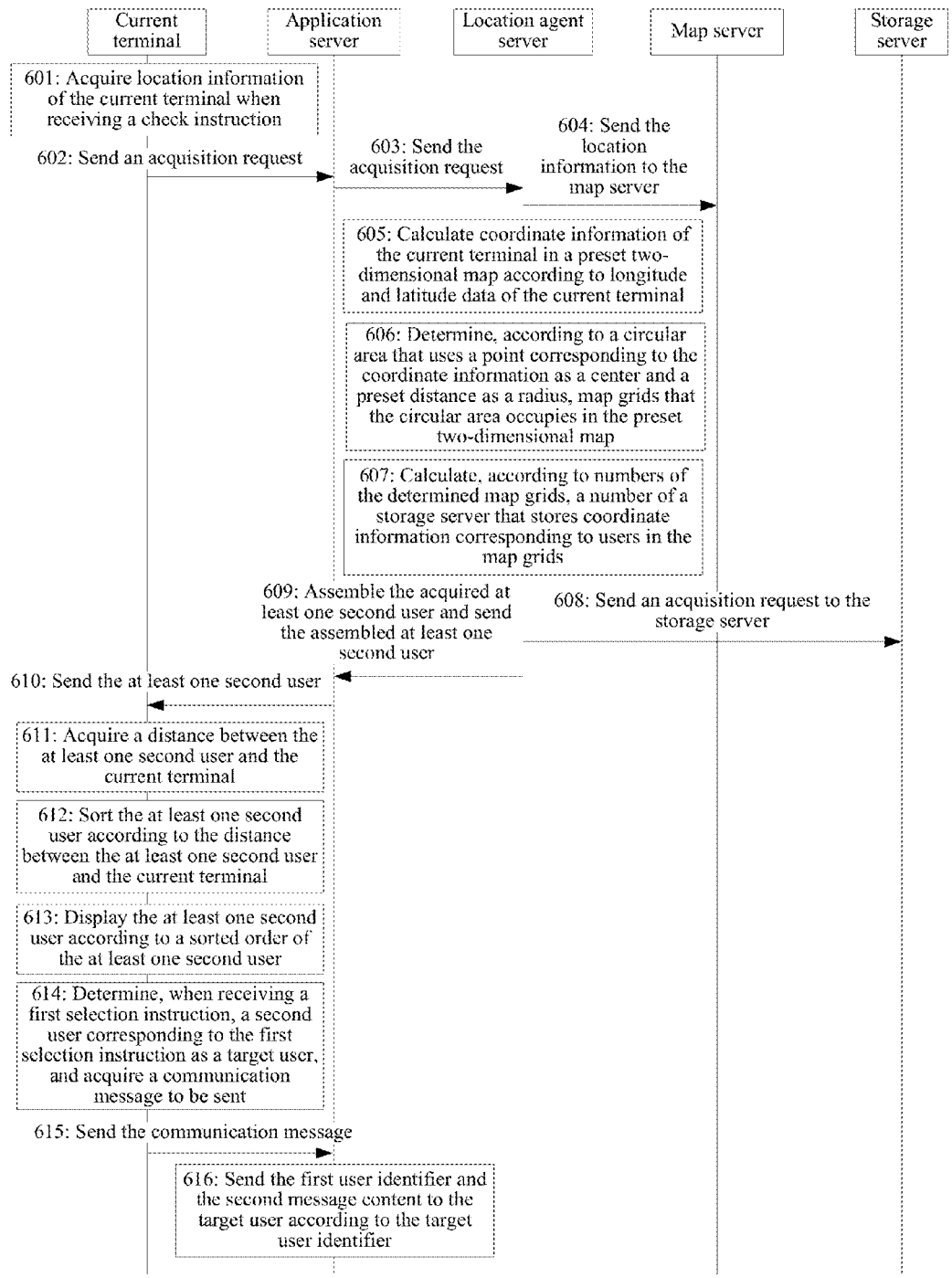
FIG. 6A is a flowchart of a method based on a social application according to an embodiment of the present invention.

FIG. 6A shows a communications method based on a social application according to an embodiment of the present invention. This embodiment of the present invention is described by using an example in which the communications method based on a social application is applied to an implementation environment shown in FIG. 2. In the implementation environment shown in FIG. 2, an example in which the specified application server in the implementation environment shown in FIG. 1 is divided into an application server, a location agent server, a map server, and multiple storage servers is used for description. This embodiment of the present invention elaborates the second implementation manner for acquiring at least one second user in the communications method based on a social application, and referring to FIG. 6A, the method includes:

Step 601: Acquire location information of a current terminal if the current terminal receives a check instruction.

A specific implementation manner of step 601 is the same as that of step 501 described above, and is not described in detail herein again.

Step 602: The current terminal sends an acquisition request to an application server, the acquisition request carrying a first user identifier of a user that has logged in to a specified application on the current terminal and the location information of the current terminal.

Specifically, the current terminal acquires a first user identifier of a user that has logged in to a specified application on the current terminal, generates an acquisition request according to the first user identifier and the location information of the current terminal, and sends the acquisition request to the application server.

In this embodiment of the present invention, the user may use an account of a social application to log in to the specified application, and in this case, the current terminal stores a first user identifier of a user that has logged in to the specified application. The first user identifier may be an identifier of the social application, or a user identifier of the user in the social application; the user identifier of the user in the social application may be an account that the user registers in the social application, and certainly, may also be a nickname of the user in the social application, and the like.

Step 603: The application server sends the acquisition request to a location agent server when the application server receives the acquisition request.

Specifically, when the application server receives the acquisition request, the application server sends the acquisition request to the location agent server through a communication channel to the location agent server.

The communication channel between the application server and the location agent server may be a tbus channel.

Step 604: The location agent server sends the location information to a map server when the location agent server receives the acquisition request, so that the map server parses the location information, to obtain longitude and latitude data of the current terminal.

Specifically, when the location agent server receives the acquisition request, the location agent server sends the location information to a map server, and the map server parses the location information, to obtain longitude and latitude data of the current terminal. Besides, the map server sends the longitude and latitude data of the current terminal to the location agent server.

The location agent server and the map server perform data communication by using the HTTP protocol.

Step 605: The location agent server receives the longitude and latitude data of the current terminal sent by the map server, and calculates, according to the longitude and latitude data of the current terminal, coordinate information of the current terminal in a preset two-dimensional map.

Specifically, when the location agent server receives the longitude and latitude data of the current terminal sent by the map server, the location agent server calculates, according to the longitude and latitude data of the current terminal and by using the following formula (1), the coordinate information of the current terminal in the preset two-dimensional map, where the coordinate information includes an abscissa and an ordinate.

$$\begin{cases} x = (180 - j) \times 40000 \times 10^3 / 360 \\ y = (90 - w) \times 20000 \times 10^3 / 180 \end{cases} \quad (1)$$

where in the foregoing formula (1), x is an abscissa of the current terminal in the preset two-dimensional map, j is longitude data of the current terminal, y is an ordinate of the current terminal in the preset two-dimensional map, and w is latitude data of the current terminal.

It should be noted that, the earth is a slightly flattened sphere, where the length of the equator is 40076 kilometers, and the length of the meridian is 40009 kilometers. The earth is approximated as a rectangle (referring to world maps we hang on the wall) using the equator as the long side of the rectangle. Then, the length of the rectangle is the length of the equator, and in this embodiment of the present invention, 40000 kilometers is used as the length of the rectangle, and 20000 kilometers is used as the width of the rectangle. In this case, the length represented by one longitude degree may be 40000 kilometers/360, and the length represented by one latitude degree is 20000 kilometers/180. In addition, in this embodiment of the present invention, a location at 180 degrees east longitude and 90 degrees north latitude is used as the origin of coordinates in the preset two-dimensional map, where the longitude represents a horizontal axis, a positive direction of the horizontal axis is east to west, the latitude represents a vertical axis, and a positive direction of the vertical axis is north to south. In this case, a preset two-dimensional map can be obtained, then the preset two-dimensional map is divided to obtain multiple square map grids having a same size, and the multiple map grids having a same size are numbered according to a given rule. For example, in this embodiment of the present invention, the preset two-dimensional map may be divided by using a square having a side length of 100 meters as a unit, and the map grids in the preset two-dimensional map may be numbered in ascending order along the horizontal axis from the origin of coordinates, as shown in FIG. 5. Certainly, the map grids in the preset two-dimensional map may also be numbered in ascending order along the vertical axis from the origin of coordinates, and this embodiment of the present invention is described by using an example in which the map grids in the preset two-dimensional map are numbered in ascending order along the horizontal axis from the origin of coordinates.

Further, after the location agent server calculates the coordinate information of the terminal in the preset two-dimensional map, the method further includes:

calculating a map grid number corresponding to the coordinate information according to the coordinate information of the terminal in the preset two-dimensional map; calculating, according to the map grid number, a number of a storage server that stores coordinate information corresponding to users in the map grid; storing the calculated map grid number and the first user identifier into a correspondence between map grid numbers and user identifiers in the storage server according to the number of the storage server; and storing the first user identifier and the acquired coordinate information into a correspondence between user identifiers and coordinate information in the storage server.

A specific operation of calculating a map grid number corresponding to the coordinate information according to the coordinate information of the terminal in the preset two-dimensional map may be: calculating a map grid number corresponding to the coordinate information according to the coordinate information of the terminal in the preset two-dimensional map and by using the following formula (2).

$$\text{GridGID} = [(40000 \times 1000)/s] \times \lfloor y/x \rfloor + \lfloor x/s \rfloor + 1 \quad (2)$$

where in the foregoing formula (2), is the map grid number corresponding to the coordinate information, s is a side length of the map grid in the preset two-dimensional map, which is a known variable, and in this embodiment of the present invention, s is 100, and represents a round down operation.

A specific operation of calculating, according to the map grid number, a number of a storage server that stores coordinate information corresponding to users in the map grid may be: calculating, according to the map grid number and by using the following formula (3), a number of a storage server that stores coordinate information corresponding to users in the map grid.

$$M = \text{hash}(\text{GridGID}) \% N \quad (3)$$

where in the foregoing formula (3), M is the number of the storage server that stores the coordinate information corresponding to users in the map grid, hash ( ) represents a hash operation, % is represents modulo operation, and N is a total quantity of storage servers in a system.

Calculating the number of the storage server by using the foregoing formula (3) and storing the coordinate information of the user into the storage server causes heavy load of the storage server. For example, the preset distance is 1 KM, that is, the radius is 1 KM, and when other users within a distance of 1 KM to the current terminal are searched for, the quantity of map grids to be searched is approximately 2000/100× 2000/100=400; a hash operation is separately performed on the 400 map grids, to obtain numbers of storage servers corresponding to the 400 map grids, and in this case, the storage servers corresponding to the 400 map grids may include all storage servers. In other words, one operation of searching for nearby users need to request data from all the storage servers, and apparently, the load of the storage servers is heavy.

Figure 6B:
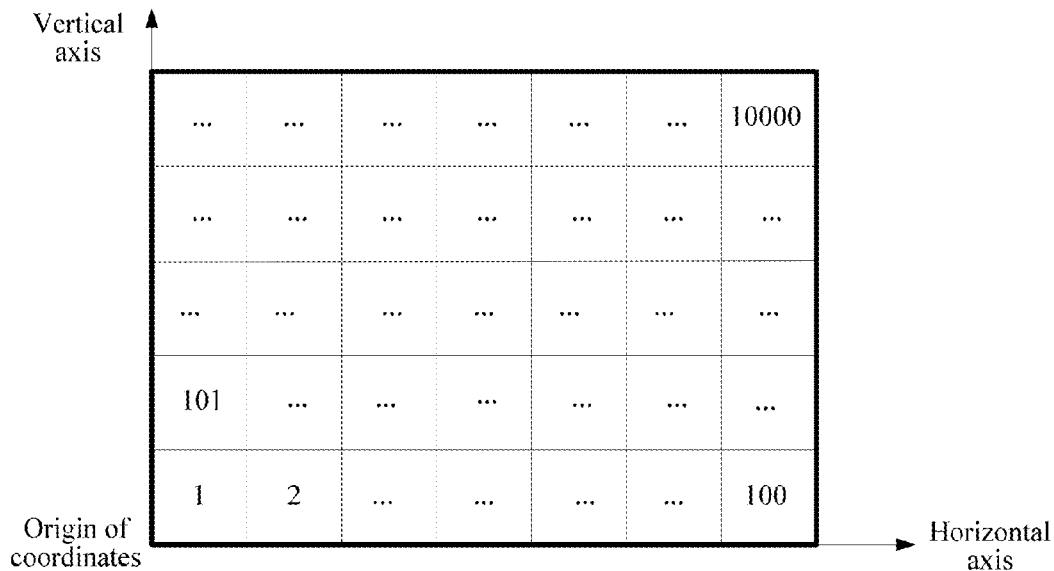
FIG. 6B is a schematic diagram of a type of map grids according to an embodiment of the present invention.

To solve the problem of heavy load of the storage servers, we should ensure that most data related to one single request of searching for users nearby is concentrated on few storage servers. Therefore, it is necessary to store, in a coarser granularity, data in some areas on a same storage server. In other words, the minimum granularity of an area in which data is stored on a same storage server should be larger than the size of the map grid. Preferably, the size of the map grid is increased, for example, the side length of the map grid is increased from 100 meters to 10000 meters, and in this way, data in a large map grid is stored on a same storage server. As shown in FIG. 6B, coordinate information of users in a large grid map defined by black thick lines in FIG. 6B is stored on a same storage server, and the large map grids may also be numbered according to the map grid numbering method in step 503 described above. In this case, a formula for calculating a number of a large map grid is shown in the following formula (4):

$$\text{VirGridGID}=[(40000\times1000)/L]\times\lfloor y/L\rfloor+\lfloor x/L\rfloor+1 \quad (4)$$

where in the forgoing formula (4), is the number of the large map grid, L is the side length of the large map grid, which is a known variable, and in this embodiment of the present invention, L is 10000.

After the number of the large map grid is determined, the number of the storage server that stores coordinate information corresponding to users in the large map grid may be calculated by using the following formula (5).

$$M=\text{hash}(\text{VirGridGID})\%N \quad (5)$$

A specific operation of storing the calculated map grid number and the first user identifier into a correspondence between map grid numbers and user identifiers in the storage server may be: if the correspondence between map grid numbers and user identifiers stored in the storage server includes a record corresponding to the first user identifier, replacing a map grid number corresponding to the first user identifier in the correspondence between map grid numbers and user identifiers stored in the storage server with the calculated map grid number; or if the correspondence between map grid numbers and user identifiers stored in the storage server does not include a record corresponding to the first user identifier, creating a corresponding record in the correspondence between map grid numbers and user identifiers, and storing the calculated map grid number and the first user identifier into the created record.

Further, after a corresponding record is created in the correspondence between map grid numbers and user identifiers, and the calculated map grid number and the first user identifier are stored into the created record, the location agent server broadcasts a deletion message to other storage servers except the current storage server, where the deletion message carries the first user identifier, so that other storage servers delete the record that includes the first user identifier.

A specific operation of storing the first user identifier and the acquired coordinate information into a correspondence between user identifiers and coordinate information in the storage server may be: if the correspondence between user identifiers and coordinate information stored in the storage server includes a record corresponding to the first user identifier, replacing coordinate information corresponding to the first user identifier in the correspondence between user identifiers and coordinate information stored in the storage server with the acquired coordinate information; or if the correspondence between user identifiers and coordinate information stored in the storage server does not include a record corresponding to the first user identifier, creating a corresponding record in the correspondence between user identifiers and coordinate information, and storing the acquired coordinate information and the first user identifier into the created record.

Further, after a corresponding record is created in the correspondence between user identifiers and coordinate information, and the acquired coordinate information and the first user identifier are stored into the created record, the location agent server broadcasts a deletion message to other storage servers except the current storage server, where the deletion message carries the first user identifier, so that other storage servers delete the record that includes the first user identifier.

Preferably, in this embodiment of the present invention, data is stored in a hash table, and the hash table may include multiple hash buckets; when the storage server stores data, calculation of hash (GridGID) % hashnum is performed, to obtain a number of a hash bucket, where hashnum is the quantity of hash buckets in the hash table. The calculation of GridGID is so regular that data in some map grids is concentrated in one hash bucket, and in this case, the hash operation may be performed on GridGID one more time, to enhance randomness of the data.

Preferably, when the storage server stores data, the data is stored in shared memory, and meanwhile, the stored data is recorded in an Open Storage Service (OSS) log, to facilitate data recovery during restart after the shared memory is cleared.

The storage server can perform two types of operations in total on the data: one is insertion, and the other is deletion. Each insertion operation and each deletion operation (excluding deletion of data when time expires) are recorded in the OSS log. An OSS log is recorded at intervals of a preset period of time. A log that exceeds a given period of time is deleted. During restart after the shared memory is cleared, first, these OSS logs are sorted in chronological order, and when data is recovered, read-in is started from the earliest OSS log; a record is inserted if an insertion operation is recorded in the OSS log, and a record is deleted if a deletion operation is recorded in the OSS log. Because the storage server stores a correspondence between user identifiers and map grid numbers, uniqueness of data can be ensured; besides, data read-in is started from the earliest record, and therefore, it can be ensured that the data read at last is the latest data. In addition, because an expiration time is set for an OSS log file, the amount of data recorded in an OSS log is not excessively large.

Further, in this embodiment of the present invention, user data stored in each map grid may be linked by using a link list, where the link table may be created by using a head insertion method, to ensure that the latest user data reported is at the front of the link list, and it is also ensured that, logically, data in the link list is sorted according to a report time.

Step 606: The location agent server determines, according to a circular area that uses a point corresponding to the coordinate information as a center and a preset distance as a radius, map grids that the circular area occupies in the preset two-dimensional map, the preset two-dimensional map including multiple map grids having a same size.

The preset distance may be configured by management staff, or set in the terminal by the user, which is not specifically limited in this embodiment of the present invention.

Step 607: The location agent server calculates, according to a number of each determined map grid, a number of a storage server that stores coordinate information corresponding to users in the map grid.

Specifically, the location agent server separately calculates, according to a number of each determined map grid and by using the foregoing formula (3), a number of a storage server that stores coordinate information corresponding to users in the map grid.

Step 608: The location agent server sends an acquisition request to the storage server according to the calculated number of the storage server, each determined map grid, and the first user identifier, to acquire a corresponding second user from the storage server.

Specifically, for each storage server of the determined storage servers, the location agent server searches for the storage server according to the calculated number of the storage server. The location agent server acquires the number of the determined map grid, and sends the acquired map grid number and the first user identifier to the storage server. The storage server acquires corresponding user identifiers from the stored correspondence between map grid numbers and user identifiers according to the map grid number; selects, among the acquired user identifiers, another user identifier except the first user identifier, and acquires corresponding coordinate information from the stored correspondence between user identifiers and coordinate information according to the selected user identifier; and determines the second user according to the acquired coordinate information. The storage server sends the determined second user to the location agent server.

The user may use different social application accounts to log in to the specified application, and therefore, in this embodiment of the present invention, user identifiers stored in the storage server may further be marked by using social application identifiers. In this embodiment of the present invention, user identifiers marked by a same social application identifier may be acquired, and users corresponding to the acquired user identifiers are determined as the at least one second user.

Further, in the storage server, a timestamp may be set for each record in the correspondence between user identifiers and coordinate information, and during selection of at least one second user, a user in a first preset period that is prior to the current time and is closest to the current time may be selected; in this case, a specific operation of acquiring corresponding coordinate information from the stored correspondence between user identifiers and coordinate information according to the selected user identifier may be: acquiring corresponding coordinate information from the stored correspondence between user identifiers and coordinate information according to the selected user identifier, and acquiring a current time, and selecting, according to a timestamp corresponding to a record to which the acquired coordinate information belongs, coordinate information in a first preset period whose timestamp is prior to the current time and closest to the current time.

In this embodiment of the present invention, the manner of acquiring at least one second user according to the acquired coordinate information may be implemented according to any of the following two situations, including:

The first situation: Determine a user corresponding to the acquired coordinate information as the at least one second user.

In this embodiment of the present invention, when the preset two-dimensional map is divided into map grids, the size of the map grids is relatively small, and therefore, a given error is allowed when the at least one second user is acquired, and the user corresponding to the acquired coordinate information may be directly determined as the at least one second user.

The second situation: Select, from the acquired coordinate information and according to the acquired coordinate information, the center and the radius, coordinate information corresponding to a geographical location that is in the preset range of the terminal, and determine a user corresponding to the selected coordinate information as the at least one second user.

To acquire the at least one second user precisely, a distance between the user corresponding to the acquired coordinate information and the current terminal may be calculated precisely according to the second manner, thereby acquiring the at least one second user according to the distance.

Validity of geographical data of the user is time-limited, and as a geographical location of the user changes, the location information of the user may expire. Therefore, an expiration time is set on the storage server for user data, and at the end of the expiration time, the storage server may clear user data that expires. For example, when data of a user is stored, an update time may be set for the data of the user, and next time data in the memory is scanned, it is determined whether a time interval between the update time and the current time exceeds the expiration time, if yes the data of the user is cleared, otherwise, the data of the user is retained.

One hash table may store about one hundred thousand pieces of user data, and the quantity of hash buckets is several hundred thousands. If the hash table is scanned thoroughly during each regular cleaning, assuming that it takes time t to scan the hash table thoroughly, the storage server is incapable of providing external services during the time t. Moreover, the expiration time of user data may be several hours, and it is unnecessary to process all data in one time.

Based on the foregoing reasons, the storage server employs a regular cleaning manner, that is, data in a limited quantity of hash buckets is processed each time, and numbers of hash buckets that need to be processed in a timer next time are recorded. It is assumed that m hash buckets are processed each time, the whole hash table includes K hash buckets, a time interval of the timer is T, and an expiration time of user data is L. Then, time for scanning the hash table once is Total=(K/m)*T. As long as Total<=L, data that expires can be cleared in time. By setting proper values of m and T, it can be ensured that the storage server can clear, in time, data that expires, and the capability of the storage server of providing external services is not affected. For example, the quantity of hash buckets processed by each timer may be 500.

Step 609: The location agent server assembles the acquired at least one second user when receiving the second user sent by each storage server, and sends the assembled at least one second user to the application server.

Because users in the preset range of the current terminal may be stored in multiple storage servers, the location agent server may receive second users sent by multiple storage servers. The location agent server needs to assemble the second users received from multiple storage servers, and sends the assembled second users to the application server.

When the location agent server sends the acquisition request to the storage server, the location agent server may create a correspondence regarding a request sending time, a total quantity of user data that should be received, a total quantity of user data that has been received, a serial number, and coordinate information of the user, where the serial number is used for identifying a current check operation performed by the current terminal on a second user. When the location agent server receives a second user sent by a storage server, if the a serial number carried in the received second user is the same as the serial number in the created correspondence, the total quantity of user data that has been received in the created correspondence is increased by 1, and if the increased total quantity of user data that has been received is equal to the total quantity of user data that should be received or the request sending time expires, the received second user is sent to the application server.

Further, if the increased total number of user data that has been received is less than the total quantity of user data that should be received or the request sending time does not expire, the location agent server continues to wait for a second user sent by the storage server.

The method in step 609 can be used to control frequency at which the current terminal requests to check users nearby, for example, assuming that the expiration time is 10 s, after sending the request for acquiring nearby users for the first time, if the current terminal sends another request for acquiring nearby users within 10 s, the location agent server directly rejects the request sent second time.

Step 610: The application server sends the at least one second user to the current terminal.

In the application server, the user identifier may be used to uniquely identify the user, and in this case, the application server may send the user identifier of the at least one second user to the current terminal, and may further send the coordinate information of the at least one second user to the current terminal.

Step 611: The current terminal acquires a distance between the at least one second user and the current terminal when the current terminal receives the at least one second user sent by the application server.

In this embodiment of the present invention, the application server may send the coordinate information of the at least one second user to the current terminal, so that the current terminal calculates the distance between the at least one second user and the current terminal according to the coordinate information of the at least one second user and the location information of the current terminal. Certainly, the location agent server may calculate the distance between the at least one second user and the current terminal according to the coordinate information of the at least one second user and coordinate information of the current terminal, and sends the distance between the at least one second user and the current terminal to the application server, so that the application server sends the distance between the at least one second user and the current terminal to the current terminal, which is not specifically limited in this embodiment of the present invention.

A specific operation of calculating, by the current terminal, the distance between the at least one second user and the current terminal according to the coordinate information of the at least one second user and the location information of the current terminal may be: acquiring coordinate information of the current terminal, and calculating the distance between the at least one second user and the current terminal according to the coordinate information of the at least one second user and the coordinate information of the current terminal.

An operation of acquiring coordinate information of the current terminal may be any one of the following two situations: (a), the current terminal parses the location information of the current terminal, to obtain longitude and latitude data of the current terminal, and calculates the coordinate information of the current terminal according to the longitude and latitude data of the current terminal and by using the foregoing formula (1); and (b), the application server sends the coordinate information of the current terminal to the current terminal.

It should be additionally noted that, the calculating, by the current terminal, the distance between the at least one second user and the current terminal according to the coordinate information of the at least one second user and the coordinate information of the current terminal may be calculating a linear distance between the coordinate information of the at least one second user and the coordinate information of the current terminal, which is not elaborated herein.

Step 612: The current terminal sorts the at least one second user according to the distance between the at least one second user and the current terminal.

Step 613: The current terminal displays the at least one second user according to a sorted order of the at least one second user.

Step 614: Determine, when receiving a first selection instruction with respect to any user among the at least one second user, the second user corresponding to the first selection instruction as a target user, and acquire a communication message to be sent, the communication message carrying a first user identifier, a target user identifier, and second message content.

Specific implementation manners of steps 612 to 614 are the same as those of steps 506 to 508 described above, and are not described in detail herein again.

Step 615: The current terminal sends the communication message to the application server when receiving a sending instruction.

The sending instruction is used for sending the communication message to the application server, and the sending instruction may be triggered by the user or the terminal. When the user needs to trigger the sending instruction, the user may perform a preset operation on the display interface of the current terminal to trigger the sending instruction. The preset operation may be a click operation, a double click operation, a multiple-click operation, a slide operation, a drag operation, a voice operation, and the like. When the terminal needs to trigger the sending instruction, the terminal may detect a period of time during which no editing instruction is received in the editing interface, and when the period of time reaches a second preset period, the terminal triggers the sending instruction.

Step 616: The application server sends the first user identifier and the second message content to the target user according to the target user identifier when the application server receives the communication message.

When the terminal uses the specified application for the first time and logs in to the application by using a social application account, the specified application server sends an authorization message to the terminal. When the terminal receives the authorization message, the terminal displays the authorization message to the user. When the user agrees to use the social application account to log in to the specified application, the terminal sends an authorization success message to the application server. The application server receives the authorization success message, and sends the authorization success message to the social application server. The social application server receives the authorization success message, acquires a user identifier and an open ID corresponding to the social application account of the user, and sends, to the application server, the user identifier and open ID corresponding to the social application account.

Further, the application server receives the user identifier and open ID corresponding to the social application account. The application server stores the user identifier and the open ID corresponding to the social application account into a correspondence between user identifiers and open IDs.

Specifically, a specific operation of sending, by the application server, the first user identifier and the second message content to the target user according to the target user identifier may be: acquiring, by the application server, a corresponding open ID from a stored correspondence between user identifiers and open IDs according to the target user identifier, and sending the first user identifier and the second message content to the target user according to the acquired open ID.

Further, to prevent the target user from being disturbed by harassment information, this embodiment of the present invention further sets an anti-harassment mechanism, where a specific process of the anti-harassment mechanism is as follows:

intercepting, by the current terminal when the current terminal receives the sending instruction, the communication message if the quantity of communication messages that have been sent in preset duration reaches a preset threshold and no reply message from the target user is received within the preset duration, and displaying interception prompt information; or determining, after the current terminal sends the communication message to the application server, that the application server has intercepted the communication message if interception prompt information sent by the application server is received, and displaying the interception prompt information.

The anti-harassment mechanism may be implemented in the terminal or in the application server. If the anti-harassment mechanism is implemented in the application server, when the application server receives the communication message that is sent by the terminal to the target user, the application server needs to determine whether the quantity of communication messages that have been received in preset duration reaches a preset threshold and whether a reply message sent by the target user to the terminal is received within the preset duration, and if the quantity of communication messages that have been received in the preset duration reaches the preset threshold and no reply message sent by the target user to the terminal is received within the preset duration, the application server intercepts the received communication message, and sends interception prompt information to the terminal.

In this embodiment of the present invention, the specified application is a non-social application. The main function of a social application is communication between users, while communication between users is not the main function of a non-social application; therefore, in this embodiment of the present invention, communication between users of a non-social application can be implemented based on a social application.

In this embodiment of the present invention, a current terminal acquires, according to location information of a current terminal and an application identifier, at least one second user that has logged in to a specified application; when receiving a selection instruction with respect to any user among the at least one second user, determines the second user corresponding to the selection instruction as a target user; acquires a communication message to be sent, and sends the communication message to an application server when receiving a sending instruction, so that the application server sends the first user identifier and the second message content to the target user according to the target user identifier. In this way, a user can know behavior of users that are not on a relation chain thereof, a social circle of the user is expanded, and the amount of information that an application can provide is improved.

Figure 7:
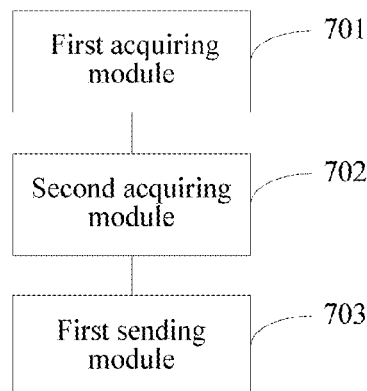
FIG. 7 is schematic structural diagram of an apparatus based on a social application according to an embodiment of the present invention.

FIG. 7 is a schematic structural diagram of an apparatus based on a social application according to an embodiment of the present invention. Referring to FIG. 7, the apparatus includes:

a first acquiring module 701, configured to acquire at least one second user according to location information of a current terminal and a specified application identifier, the second user being a user whose geographical location is in a preset range of the current terminal;

a second acquiring module 702, configured to determine, when receiving a first selection instruction with respect to any user among the at least one second user, the second user corresponding to the first selection instruction as a target user, and acquire a communication message to be sent, the communication message carrying a first user identifier of a user that has logged in to a specified application on the current terminal, a target user identifier, and second message content; and a first sending module 703, configured to send the communication message to a specified application server when receiving a sending instruction, so that the specified application server sends the first user identifier and the second message content to the target user according to the target user identifier.

Optionally, the first acquiring module 701 includes:

a first acquiring unit, configured to acquire the location information of the current terminal when receiving a check instruction;

a first sending unit, configured to send an acquisition request to the specified application server, the acquisition request carrying the first user identifier and the location information, so that the specified application server acquires at least one second user from a user database according to the first user identifier and the location information, the user database storing an identifier of at least one user that logs in to the specified application and coordinate information of each user; and a first receiving unit, configured to receive at least one second user sent by the specified application server.

Optionally, the apparatus further includes:

a third acquiring module, configured to acquire a distance between the at least one second user and the current terminal;

a sorting module, configured to sort the at least one second user according to the distance between the at least one second user and the current terminal; and a display module, configured to display the at least one second user according to a sorted order of the at least one second user.

Optionally, the second acquiring module 702 includes:

a determining unit, configured to determine, when receiving a first selection instruction with respect to any user among the at least one second user, the second user corresponding to the first selection instruction as the target user;

a display unit, configured to display a message content editing page, the message content editing page comprising an editing interface and at least one piece of first message content;

a first generating unit, configured to generate, when receiving a second selection instruction with respect to the at least one piece of first message content, second message content according to an editing instruction received through the editing interface and the first message content corresponding to the second selection instruction; and a second generating unit, configured to generate the communication message according to the second message content, the first user identifier and the target user identifier.

Optionally, the apparatus further includes:

a first interception module, configured to intercept, when the sending instruction is received, the communication message if the quantity of communication messages that have been sent in preset duration reaches a preset threshold and no reply message from the target user is received within the preset duration, and display interception prompt information; or a determining module, configured to determine, after the communication message is sent to the specified application server, that the specified application server has intercepted the communication message if interception prompt information sent by the specified application server is received, and display the interception prompt information.

In this embodiment of the present invention, a current terminal acquires, according to location information of a current terminal and a specified application identifier, at least one second user that has logged in to a specified application; when receiving a selection instruction with respect to any user among the at least one second user, determines the second user corresponding to the selection instruction as a target user; acquires a communication message to be sent, and sends the communication message to a specified application server when receiving a sending instruction, so that the specified application server sends the first user identifier and the second message content to the target user according to the target user identifier. In this way, a user can know behavior of users that are not on a relation chain thereof, a social circle of the user is expanded, and the amount of information that an application can provide is improved.

Figure 8:
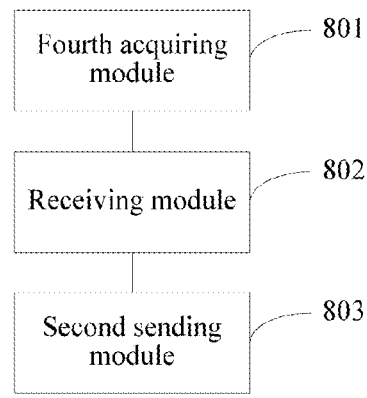
FIG. 8 is schematic structural diagram of another apparatus based on a social application according to an embodiment of the present invention.

FIG. 8 is a schematic structural diagram of a communications apparatus based on a social application according to an embodiment of the present invention. Referring to FIG. 8, the apparatus includes:

a fourth acquiring module 801, configured to acquire at least one second user corresponding to a first user that has logged in to a specified application on a terminal, and send the at least one second user to the terminal;

a receiving module 802, configured to receive a communication message sent by the terminal, the communication message carrying a first user identifier, a target user identifier, and second message content, and the target user identifier being an identifier of a user selected by the first user from the at least one second user; and a second sending module 803, configured to send the first user identifier and the second message content to the target user according to the target user identifier.

Optionally, the fourth acquiring module 801 includes:

a second receiving unit, configured to receive an acquisition request sent by the terminal, the acquisition request carrying the first user identifier and location information of the terminal;

a second acquiring unit, configured to acquire at least one second user from a user database according to the first user identifier and the location information, the user database storing an identifier of at least one user that has logged in to the specified application and location information of each user; and a second sending unit, configured to send the at least one second user to the terminal.

Optionally, the second acquiring unit includes:

a first acquiring subunit, configured to acquire, according to the location information, coordinate information of the terminal in a preset two-dimensional map;

a determining subunit, configured to determine, according to a circular area that uses a point corresponding to the coordinate information as a center and a preset distance as a radius, map grids that the circular area occupies in the preset two-dimensional map, the preset two-dimensional map including multiple map grids having a same size; and a second acquiring subunit, configured to acquire at least one second user from the user database according to the determined map grids and the first user identifier.

Optionally, the second acquiring subunit is specifically configured to:

acquire numbers of the determined map grids, and acquire, from a stored correspondence between map grid numbers and user identifiers, corresponding user identifiers according to the numbers of the map grids;

select, among the acquired user identifiers, another user identifier except the first user identifier;

acquire, according to the selected user identifier, corresponding coordinate information from a stored correspondence between user identifiers and coordinate information; and determine at least one second user according to the acquired coordinate information.

Optionally, the second acquiring subunit is further configured to:

determine a user corresponding to the acquired coordinate information as the at least one second user; or select, from the acquired coordinate information and according to the acquired coordinate information, the center and the radius, coordinate information corresponding to a geographical location that is in the preset range of the terminal, and determine a user corresponding to the selected coordinate information as the at least one second user.

Optionally, the second acquiring unit further includes:

a calculation subunit, configured to calculate a map grid number corresponding to the coordinate information according to the coordinate information of the terminal in the preset two-dimensional map;

a first storage subunit, configured to store the map grid number and the first user identifier into a correspondence between map grid numbers and user identifiers; and a second storage subunit, configured to store the first user identifier and the coordinate information into a correspondence between user identifiers and coordinate information.

Optionally, the apparatus further includes:

a second interception module, configured to intercept, when the communication message sent by the terminal to the target user is received, the received communication message if the quantity of communication messages that have been received in preset duration reaches a preset threshold and no reply message sent by the target user to the terminal is received within the preset duration, and send interception prompt information to the terminal.

In this embodiment of the present invention, after acquiring at least one second use, the server sends the at least one second user to the terminal, and when receiving a communication message sent by the terminal, the server sends the first user identifier and the second message content to the target user according to the target user identifier. In this way, a user can know behavior of users that are not on a relation chain thereof, a social circle of the user is expanded, and the amount of information that an application can provide is improved.

It should be noted that, when the communications apparatus based on a social application according to the forgoing embodiment implements communication based on the social application, division of the foregoing functional modules is merely an example for description. In an actual application, the foregoing functions may be assigned to and completed by different modules as needed, that is, the internal structure of the apparatus is divided into different functional modules to implement all or some of the functions described above. In addition, the communications apparatus based on a social application according to the forgoing embodiment belongs to the same conception as the embodiment of the communications method based on a social application. Refer to the method embodiment for details of the specific implementation process, which is not described herein again.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present invention. Any modification, equivalent replacement, or improvement made within the spirit and principle of the present invention shall fall within the protection scope of the present invention.

What is claimed is:

1. A communications method based on a social application, the method comprising:

acquiring at least one second user according to location information of a current terminal and a specified application identifier, the second user being a user whose geographical location is in a preset range of the current terminal;

determining, when receiving a first selection instruction with respect to any user among the at least one second user, the second user corresponding to the first selection instruction as a target user, and acquiring a communication message to be sent, the communication message carrying a first user identifier of a user that has logged in to a specified application on the current terminal, a target user identifier, and second message content;

sending the communication message to a specified application server when receiving a sending instruction, so that the specified application server sends the first user identifier and the second message content to the target user according to the target user identifier; and intercepting, when the sending instruction is received, the communication message if the quantity of communication messages that have been sent in preset duration reaches a preset threshold and no reply message from the target user is received within the preset duration, and displaying interception prompt information.

2. The method according to claim 1, wherein the acquiring at least one second user according to location information of a current terminal and a specified application identifier comprises:

acquiring the location information of the current terminal when receiving a check instruction;

sending an acquisition request to the specified application server, the acquisition request carrying the first user identifier and the location information, so that the specified application server acquires at least one second user from a user database according to the first user identifier and the location information, the user database storing an identifier of at least one user that logs in to the specified application and coordinate information of each user; and receiving the at least one second user sent by the specified application server.

3. The method according to claim 2, further comprising:

acquiring a distance between the at least one second user and the current terminal;

sorting the at least one second user according to the distance between the at least one second user and the current terminal; and displaying the at least one second user according to a sorted order of the at least one second user.

4. The method according to claim 1, wherein the acquiring a communication message to be sent comprises:

displaying a message content editing page, the message content editing page comprising an editing interface and at least one piece of first message content;

generating, when receiving a second selection instruction with respect to the at least one piece of first message content, second message content according to an editing instruction received through the editing interface and the first message content corresponding to the second selection instruction; and generating the communication message according to the second message content, the first user identifier and the target user identifier.

5. A communications method based on a social application, the method comprising:

acquiring at least one second user corresponding to a first user that has logged in to a specified application on a terminal, and sending the at least one second user to the terminal;

receiving a communication message sent by the terminal, the communication message carrying a first user identifier, a target user identifier, and second message content, and the target user identifier being an identifier of a user selected by the first user from the at least one second user; and sending the first user identifier and the second message content to the target user according to the target user identifier;

wherein the acquiring at least one second user from a user database according to the first user identifier and the location information comprises:
acquiring coordinate information of the terminal in a preset two-dimensional map according to the location information;
determining, according to a circular area that uses a point corresponding to the coordinate information as a center and a preset distance as a radius, map grids that the circular area occupies in the preset two-dimensional map, the preset two-dimensional map comprising multiple map grids having a same size; and
acquiring at least one second user from the user database according to the determined map grids and the first user identifier;
wherein the acquiring at least one second user from the user database according to the determined map grids and the first user identifier comprises:
acquiring numbers of the determined map grids, and acquiring, from a stored correspondence between map grid numbers and user identifiers, corresponding user identifiers according to the numbers of the map grids;
selecting, among the acquired user identifiers, another user identifier except the first user identifier;
acquiring, according to the selected user identifier, corresponding coordinate information from a stored correspondence between user identifiers and coordinate information; and
determining at least one second user according to the acquired coordinate information.

6. The method according to claim 5, wherein the acquiring at least one second user corresponding to a first user that has logged in to a specified application on a terminal, and sending the at least one second user to the terminal comprises:
receiving an acquisition request sent by the terminal, the acquisition request carrying the first user identifier and location information of the terminal;
acquiring at least one second user from a user database according to the first user identifier and the location information, the user database storing an identifier of at least one user that has logged in to the specified application and location information of each user; and
sending the at least one second user to the terminal.

7. The method according to claim 5, wherein the determining at least one second user according to the acquired coordinate information comprises:
determining a user corresponding to the acquired coordinate information as the at least one second user; or
selecting, from the acquired coordinate information and according to the acquired coordinate information, the center and the radius, coordinate information corresponding to a geographical location that is in the preset range of the terminal, and determining a user corresponding to the selected coordinate information as the at least one second user.

8. The method according to claim 5, after the acquiring coordinate information of the terminal in a preset two-dimensional map according to the location information, further comprising:
calculating a map grid number corresponding to the coordinate information according to the coordinate information of the terminal in the preset two-dimensional map;
storing the map grid number and the first user identifier into a correspondence between map grid numbers and user identifiers; and
storing the first user identifier and the coordinate information into a correspondence between user identifiers and coordinate information.

9. The method according to claim 5, after the receiving a communication message sent by the terminal, further comprising:
intercepting, when the communication message sent by the terminal to the target user is received, the received communication message if the quantity of communication messages that have been received in preset duration reaches a preset threshold and no reply message sent by the target user to the terminal is received within the preset duration, and sending interception prompt information to the terminal.

10. A communications apparatus based on a social application, comprising a processor, a memory, and multiple instruction modules executed by a computer, the multiple instruction module comprising:
a first acquiring module, configured to acquire at least one second user according to location information of a current terminal and a specified application identifier, the second user being a user whose geographical location is in a preset range of the current terminal;
a second acquiring module, configured to determine, when receiving a first selection instruction with respect to any user among the at least one second user, the second user corresponding to the first selection instruction as a target user, and acquire a communication message to be sent, the communication message carrying a first user identifier of a user that has logged in to a specified application on the current terminal, a target user identifier, and second message content;
a first sending module, configured to send the communication message to a specified application server when receiving a sending instruction, so that the specified application server sends the first user identifier and the second message content to the target user according to the target user identifier; and
a first interception module, configured to intercept, when the sending instruction is received, the communication message if the quantity of communication messages that have been sent in preset duration reaches a preset threshold and no reply message from the target user is received within the preset duration, and display interception prompt information.

11. The apparatus according to claim 10, wherein the first acquiring module comprises:
a first acquiring unit, configured to acquire the location information of the current terminal when receiving a check instruction;
a first sending unit, configured to send an acquisition request to the specified application server, the acquisition request carrying the first user identifier and the location information, so that the specified application server acquires at least one second user from a user database according to the first user identifier and the location information, the user database storing an identifier of at least one user that logs in to the specified application and coordinate information of each user; and
a first receiving unit, configured to receive at least one second user sent by the specified application server.

12. The apparatus according to claim 11, further comprising:
a third acquiring module, configured to acquire a distance between the at least one second user and the current terminal;

a sorting module, configured to sort the at least one second user according to the distance between the at least one second user and the current terminal; and a display module, configured to display the at least one second user according to a sorted order of the at least one second user.

13. The apparatus according to claim 10, wherein the second acquiring module comprises:

a determining unit, configured to determine, when receiving a first selection instruction with respect to any user among the at least one second user, the second user corresponding to the first selection instruction as the target user;

a display unit, configured to display a message content editing page, the message content editing page comprising an editing interface and at least one piece of first message content;

a first generating unit, configured to generate, when receiving a second selection instruction with respect to the at least one piece of first message content, second message content according to an editing instruction received through the editing interface and the first message content corresponding to the second selection instruction; and a second generating unit, configured to generate the communication message according to the second message content, the first user identifier and the target user identifier.

* * * * *